US006601604B1

(12) United States Patent
Cooper

(10) Patent No.: US 6,601,604 B1
(45) Date of Patent: Aug. 5, 2003

(54) FIRE-CONTROL SPRINKLER SYSTEM

(76) Inventor: Michael S. Cooper, 26010 N. 1st Ave., Phoenix, AZ (US) 85085

( * ) Notice: Subject to any disclaimer, the term of this patent is extended or adjusted under 35 U.S.C. 154(b) by 0 days.

(21) Appl. No.: 09/596,627

(22) Filed: Jun. 19, 2000

Related U.S. Application Data

(63) Continuation-in-part of application No. 09/376,112, filed on Feb. 1, 1999, now abandoned, which is a continuation-in-part of application No. 09/074,758, filed on May 8, 1998, now abandoned.

(51) Int. Cl.[7] .......................... A62C 35/60; F16K 51/00
(52) U.S. Cl. ................... 137/269; 137/360; 137/561 A; 169/16
(58) Field of Search ................. 137/269, 270, 137/360, 552, 561 A, 561 R, 557, 559; 73/861.74, 861.76; 169/16, 17; 200/81.9 R; 251/83

(56) References Cited

U.S. PATENT DOCUMENTS

| 3,982,561 A | * | 9/1976 | Harthun ..................... 251/83 X |
| 6,076,545 A | * | 6/2000 | Cooper ........................ 137/360 |
| 6,491,056 B2 | * | 12/2002 | Gibb ........................... 137/271 |

* cited by examiner

*Primary Examiner*—Kevin Lee
(74) *Attorney, Agent, or Firm*—Martin L. Stoneman

(57) ABSTRACT

This invention provides for a valve system for use in fire suppression systems that provides pressure relief, pressure testing, and drain/test fluid flow capability. The valve system consists of a valve body with an attached riser. Adjustably attached to the riser is a rotary handle for raising and lowering a spring loaded valve stem. A blocking plug is provided for attachment to the handle which operates to block the movement of the valve stem during pressure testing of the fire suppression system. A tension disk is adjustably attached to the inside of the riser to manually adjust the spring tension. In addition, a means is provided for preventing system fluid from contacting the spring.

69 Claims, 11 Drawing Sheets

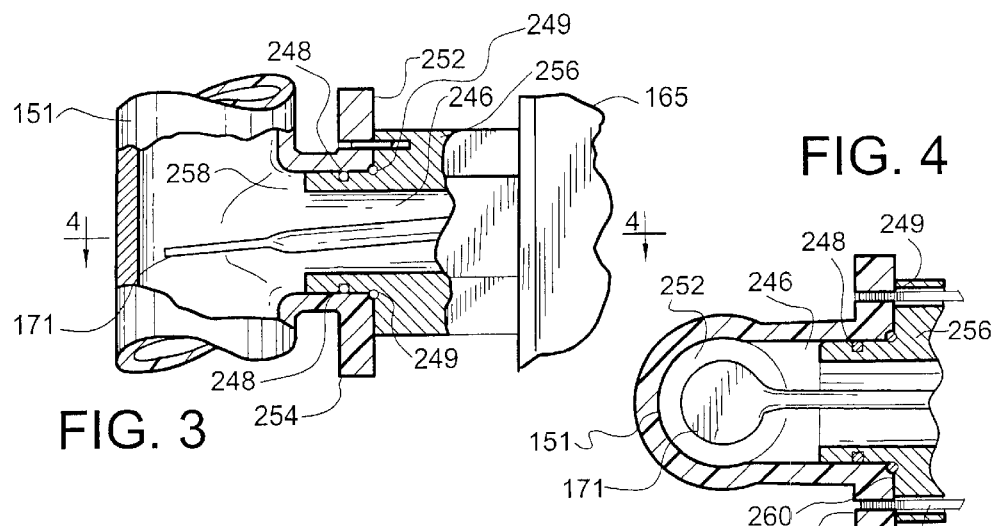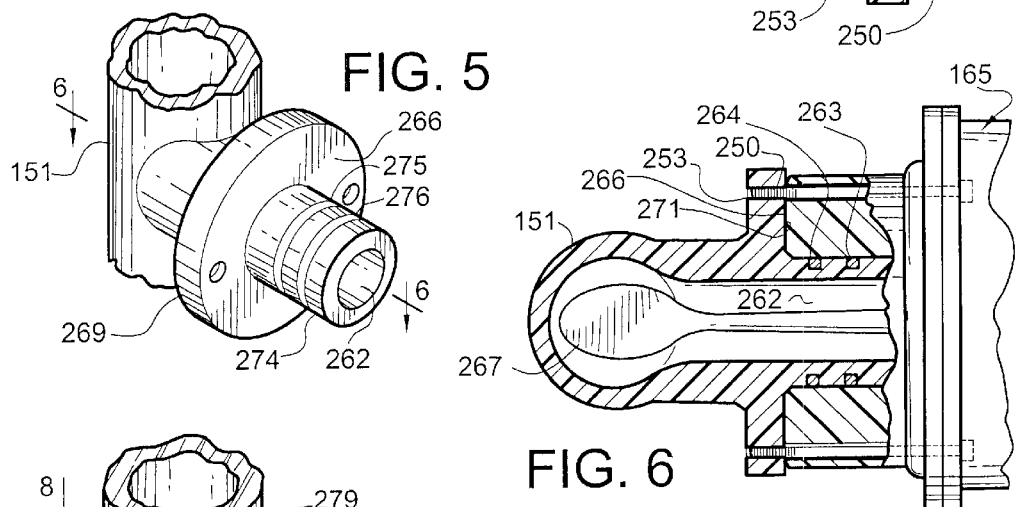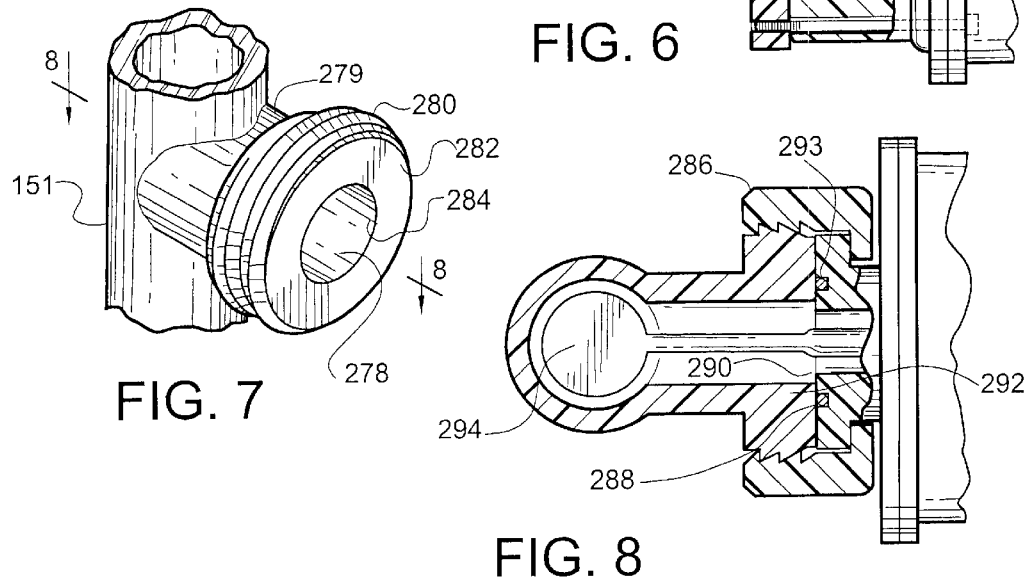

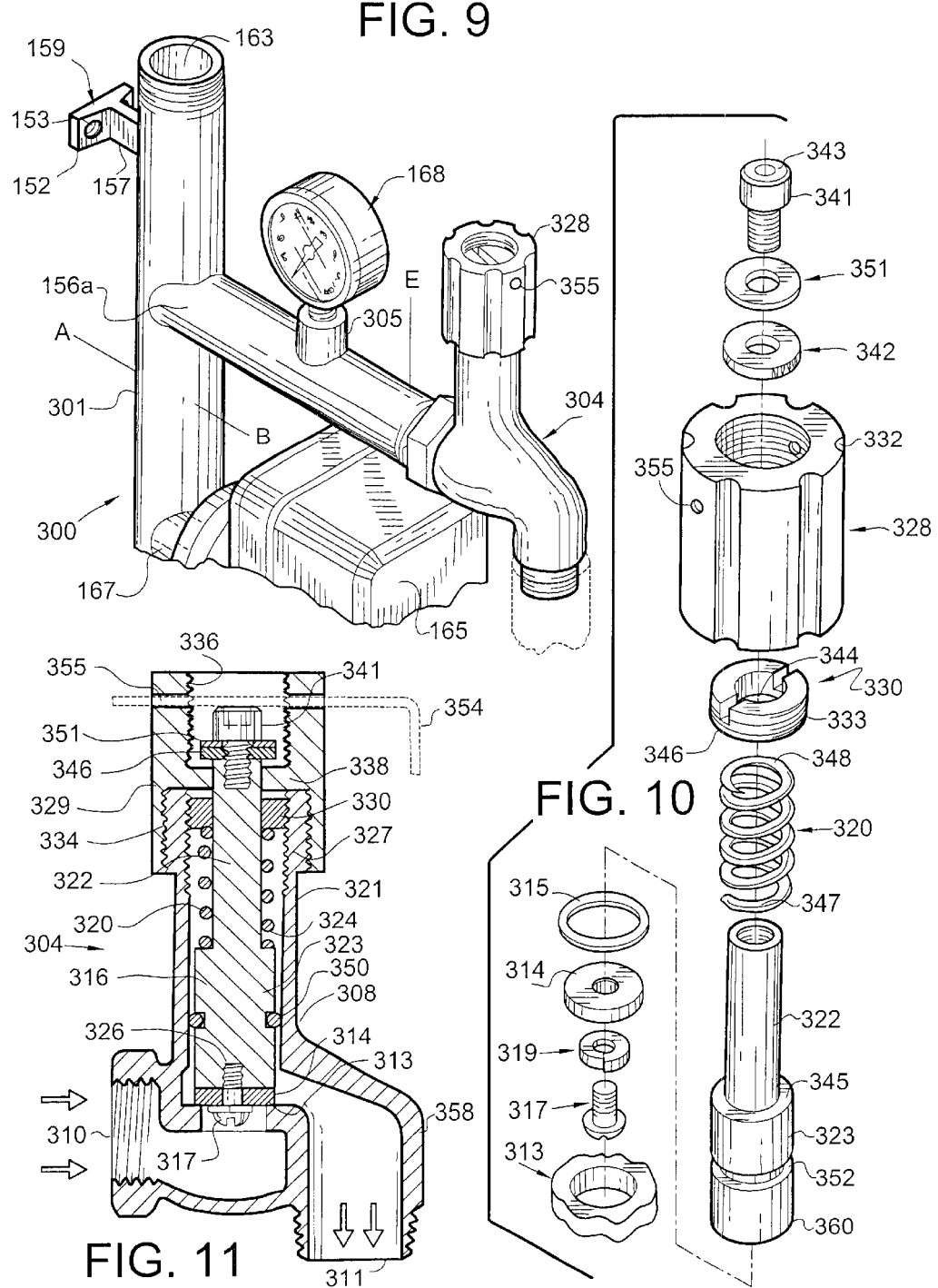

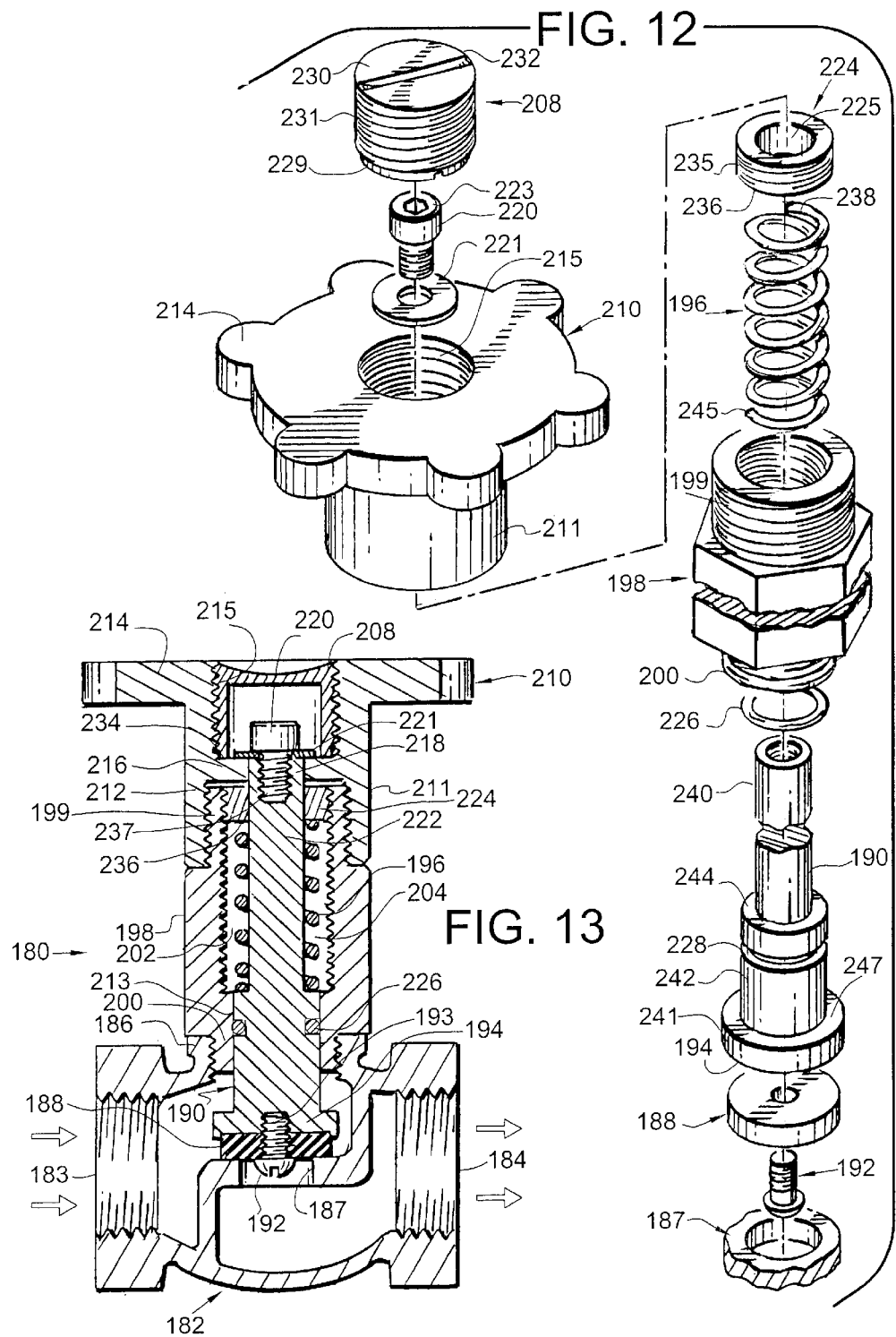

FIRE-CONTROL SPRINKLER SYSTEM

CROSS-REFERENCE TO RELATED APPLICATIONS

The present application is a continuation-in-part of my application Ser. No. 09/376,112, filed Feb. 1, 1999 now abandoned, entitled "Unitary Valve System", abandoned in favor of this application; which was a continuation-in-part of my application Ser. No. 09/074,758, filed May 8, 1998 now abandoned, entitled "Unitary Valve System", now abandoned. The present application is related to my copending application Ser. No. 08/840,421, filed Apr. 29, 1997 entitled "Fire Control Sprinkler System Riser Means"; which was a continuation-in-part of my application Ser. No. 08/604,732, filed Feb. 21, 1996, entitled "Fire-Control Sprinkler System Riser Means", now abandoned. All of these applications are incorporated herein by this reference; and none are admitted to be prior art with respect to the present invention by their mention in this cross-reference section.

BACKGROUND OF THE INVENTION

Typically, commercial buildings and an increasing number of residential structures are provided with fire suppression systems which dispense a fire suppression medium in the event of a fire. These fire sprinkler systems typically have a central pipe conduit from which a labyrinth of individual piping systems containing a fire suppression medium under pressure are attached. In the event of a fire, sensors which are attached to the individual piping systems are activated thereby releasing the pressurized fire suppression medium in the hopes of quenching the fire. In many instances, the sudden release of system pressure activates a silent and/or audible alarm which alerts both those persons which are on the premises and the local fire authority that a fire is in progress.

Since typical fire suppression systems contain fluids under pressure, some means are needed to both check the integrity of the system against leakage and to provide for a means to alleviate system excess pressure in order to prevent catastrophic system rupture. In addition, a means is required to drain the system if the need arises and/or to quickly depressurize the system in order to check the integrity of the alarm.

Typically, in plumbing fire-control sprinkler connections to a building water supply, the lower end of a riser pipe will be connected to a water supply pipe and the upper end will be connected to an outlet pipe to the sprinkler system, the riser pipe being stabilized in position by connecting it to the building structure, as by tying it to a beam. And certain useful components will be attached by porting to the riser pipe, usually the following: a flow switch to ascertain whether or not there is a flow in the riser pipe to the fire sprinkler system and to relay this information where needed, as to fire departments; a test and drain valve to open the riser pipe to a drain for the purposes of testing, bleeding, etc; a pressure gauge to deliver a read-out of the water pressure in the riser pipe; and a relief valve to open the riser pipe to a drain in the event a certain (usually settable) water pressure is exceeded in the riser pipe.

To avoid doing the above as on-the-spot plumbing labor, it has been attempted for commercial uses to pre-make a steel, epoxy-coated riser manifold containing ports for the component attachments. Then such manifold, with or without components attached, may be plumbed on site for connection to a water inlet and sprinkler outlet. But there are still many unsolved problems, especially for residential uses where the sprinkler system is part of a drinkable water system. Manifolds for riser purposes, especially for residential risers, are not available with minimum lengths and costs, with efficient arrangement of ports and of pipe threads for component connection, with efficient means for supporting the riser in connecting to a structure, with abilities for safe and efficient use in all locations in any direction, etc.

Further, efficient riser port and component arrangements have not achieved their potentials in terms of improved structures, combined purpose lines, or combined purpose components. This is especially true in the areas of adapting plastics techniques in novel ways to such efficient riser, port, and component arrangements.

Additionally, flow switches are normally manufactured for connection plumbing by way of pipe threads, usually tapered pipe threads; however, there are many inefficiencies in such a connection. Eliminating such a connection would permit elimination of: an unnecessary joint which may be a point of current or future leakages; a large brass adapter fitting which is supplied with the flow switch for threaded pipe mounting; the use and need for thread sealing materials such as Teflon tape or pipe dope; the need for a large size wrench or pipe wrench (to tighten a 1" N.P.T. tapered fitting requires a large amount of torque which in turn puts a great stress upon the entire manifold and pipe system—this stress could work loose the mounting brackets, screws, etc.); and the need to carefully orient the final positioning of the flow switch when rotating (tightening) the switch onto a threaded port for proper switch operation. Thus, a threaded attachment means, utilizing tapered pipe thread, provides a potential point of leakage, additional labor to assemble, unnecessary components and added cost. There is a need in the industry for an improved method and product for flow switch connection and for lower overall cost.

Even further, considering the fact that valves typically use springs in order to have pressure relief capability, a means is needed to insulate the valve spring from the system fluid in order to increase the useful life of the valve. To accomplish some of the above-mentioned valve requirements, typical fire suppression systems incorporate a multi-valve system which includes individual pressure relief valves, gate valves and lateral piping arrangements. Though these multi-valve systems are adequate to perform some of the above-mentioned requirements, they in turn require multiple components and a separate piping system necessitating an increase in expense and space requirements. Information relevant to attempts to address these problems can be found in, e.g., U.S. Pat. No. 5,662,139. However, the elongated handle described therein may be vulnerable to accidental movement. In addition, the relatively short travel distance along the cammed surface between the open and closed position may result in the "water hammer" effect which arises when a fluid flow through a piping system is suddenly terminated, thereby creating a reverberating pressure wave. And, in addition to other disadvantages, current such valves do not provide a means to insulate the spring from the system fluid.

Thus, there exists a need for a new and improved unitary valve system for use in fire suppression systems which provides for a choice between pressure test, pressure relief, and drain/test fluid flow capability, and which is less subject to accidental opening and closing and a system which is less prone to the creation of the water hammer effect. In addition, there exists a need for a means to insulate the spring from the system fluid in order to increase the useful life of the valve.

And also, for the foregoing reasons, there is a need for a fire-control sprinkler system with improved riser, component, and arrangement structures of the kind below described.

OBJECTS OF THE INVENTION

A primary object of the present invention is to fulfill the above-mentioned needs by the provision of a multi-function unitary valve system for providing pressure test, pressure relief, and drain/test fluid flow capability. A further primary object of the present invention is to provide such a system which is efficient, inexpensive, easy to use, as well as overcoming the other above-mentioned problems. Another primary object of the present invention is to fulfill the above-mentioned needs by the provision of a sprinkler riser system having an efficient unitary manifold construction. A further object is to provide an improved method of component connection. A further primary object of the present invention is to provide such a fire-control sprinkler system which is efficient and inexpensive, as well as overcoming the other abovementioned problems. Other objects of this invention will become apparent with reference to the following invention descriptions.

SUMMARY OF THE INVENTION

According to a preferred embodiment of the present invention, there is provided a multi-function unitary valve system for use in a fluid system containing a fluid and having pressure testing, pressure relief, and drain/test free fluid flow capability, comprising, in combination: a valve body having an inlet portion, an outlet portion, and a valve seat; a valve riser affixed to such valve body and having an exterior surface and an internal bore; a valve stem concentrically disposed within such valve riser and having an upper portion and a lower portion; a first sealer, to assist sealing at such valve seat, affixed to such lower portion of such valve stem and structured and arranged for engagement with such valve seat when such valve stem is lowered; a controller, adjustably attached to such exterior surface of such valve riser, structured and arranged to implement raising and lowering of such valve stem; an engaging element, structured and arranged to attach to such valve stem adjacent such upper portion of such valve stem and to engage such controller; and an urger structured and arranged to urge such first sealer towards such valve seat.

Further, in accordance with a preferred embodiment thereof, this invention provides a multi-function unitary valve system for use in a fluid system containing a fluid and having pressure testing, pressure relief, and drain/test free fluid flow capability, comprising, in combination: a valve body having an inlet portion, an outlet portion, and a valve seat; a valve riser affixed to such valve body and having an upper end and having an internal bore; a valve stem concentrically disposed within such valve riser and having an upper portion and a lower portion; a first sealing means for assisting sealing at such valve seat, affixed to such lower portion of such valve stem and structured and arranged for engagement with such valve seat when such valve stem is lowered; a control means, adjustably attached to such upper end of such valve riser, for implementing raising and lowering of such valve stem; an engagement means, structured and arranged for attachment adjacent such upper portion of such valve stem, for engaging such control means; an urging means for urging such first sealing means towards such valve seat; and a blocking means, removably affixed in such control means, for implementing blocking of movement of such valve stem away from such valve seat.

Also, it provides such a system wherein such control means comprises a handle having a threaded recessed upper portion; and, further, wherein such blocking means comprises a blocking plug having an externally threaded substantially cylindrical portion structured and arranged for engagement with such threaded recessed upper portion of such handle. And it provides such a system wherein such first sealing means is displaced from such valve seat when such control means is in a raised position, whereby such drain/test free fluid flow capability is provided.

Further, it provides such a system wherein such first sealing means is removably seated against such valve seat when such control means is in a lowered position, whereby such pressure relief capability is provided. Also, it provides such a system wherein such first sealing means is irremovably seated against such valve seat when such valve stem is blocked by such blocking means, whereby pressure testing capability is provided.

Moreover, the present invention provides such a multi-function unitary valve system wherein such engagement means comprises a threaded fastener. It also provides such a system wherein an upper portion of such valve stem comprises a threaded portion structured and arranged for engagement with such threaded fastener. Further, it provides such a system wherein such upper end of such valve riser comprises an upper riser threaded portion. Still further, it provides such a system wherein such handle further comprises a substantially cylindrical lower end having a threaded interior recess structured and arranged to engage such upper riser threaded portion. Also it provides such a system wherein such urging means comprises a helical spring structured and arranged for location adjacent such upper portion of such valve stem.

In addition, the present invention provides such a multi-function unitary valve system wherein: such first sealing means is displaced from such valve seat when such control means is in a raised position, whereby such drain/test free fluid flow is provided; such first sealing means is removably seated against such valve seat when such control means is in a lowered position, whereby such pressure relief capability is provided; and such first sealing means is irremovably seated against such valve seat when such valve stem is blocked by such blocking means and when such control means is in a lowered position, whereby pressure testing capability is provided. It also provides such a system wherein such engagement means comprises an annular washer and such first sealing means comprises a valve washer.

In addition, the present invention provides such a multi-function unitary valve system further comprising a second sealing means, attached to such lower portion of such valve stem between such helical spring and such valve seat, for essentially preventing such fluid from contacting such helical spring. Also, it provides such a system wherein such second sealing means comprises an essentially rubber material. Still further, it provides such a system further comprising an adjustment means, disposed within such internal bore, for adjusting such urging of such urging means. Even further, it provides such a system further comprising: a second sealing means, attached to such lower portion of such valve stem, for essentially preventing such fluid from contacting such urging means; and an adjustment means, disposed within such internal bore, for adjusting such urging of such urging means.

Further, in accordance with a preferred embodiment thereof, this invention provides a multi-function unitary valve system for use in a fluid system containing a fluid and having pressure testing, pressure relief, and test/drain free fluid flow capability, comprising, in combination: a valve body having an inlet portion, an outlet portion, and a valve seat; a valve riser, affixed to such valve body, having an upper riser threaded portion and having an internal bore defined by a riser inner wall; a valve stem concentrically disposed within such valve riser and having an upper portion and a lower portion; a first sealing means for assisting sealing at such valve seat, affixed to such lower portion of such valve stem and structured and arranged for engagement with such valve seat when such valve stem is lowered; a handle having a threaded recessed upper portion and a substantially cylindrical lower portion having a threaded internal recess structured and arranged for releasable attachment with such upper riser threaded portion; a blocking plug having an externally threaded substantially cylindrical lower portion structured and arranged for engagement with such threaded recessed upper portion of such handle, an engagement means, structured and arranged for attachment adjacent such upper portion of such valve stem, for engaging such control means; a helical spring, disposed within such valve riser, for urging such first sealing means against such valve seat. And it provides such a system wherein such riser inner wall comprises a threaded portion.

Yet in addition, it provides such a system further comprising a tension disk, such tension disk comprising: a substantially cylindrical outer surface comprising external threads structured and arranged to engage such threaded portion of such riser inner wall; a concentric aperture structured and arranged to allow unobstructed movement of such valve stem through such concentric aperture; and a bottom disk surface structured and arranged for engagement with a top coil of such helical spring. And it provides such a system further comprising a gasket, attached to such lower portion of such valve stem, structured and arranged for slidable engagement with such riser inner wall, whereby such fluid is essentially prevented from contacting such helical spring. It also provides such a system further comprising a gasket, attached to such lower portion of such valve stem, sized and arranged for slidable engagement with such riser inner wall, whereby such fluid is essentially prevented from contacting such helical spring.

Even moreover, this invention provides such a system wherein such handle is structured and arranged to displace such first sealing means from such valve seat when such handle is in a raised position whereby such test/drain free fluid flow capability is provided. And it provides such a system wherein such handle is structured and arranged to removably seat such first sealing means against such valve seat when such handle is in a lowered position whereby such pressure relief capability is provided. It also provides such a system wherein such handle is structured and arranged to irremovably seat such first sealing means against such valve seat when: said handle is in a lowered position and said blocking plug is affixed to such handle, whereby such pressure test capability is provided. And it provides such a system wherein: said engagement means comprises a threaded fastener; said upper portion of such valve stem comprises a threaded portion structured and arranged for engagement with such threaded fastener; and said first sealing means comprises a valve washer; and, further, wherein said engagement means comprises an annular washer, and said first sealing means comprises a valve washer.

Yet further, according to a preferred embodiment thereof, this invention provides a multifunction unitary valve system for use in a fluid system containing a fluid and having pressure testing, pressure relief, and drain/test free fluid flow capability, comprising, in combination: a valve body having an inlet portion, an outlet portion, and a valve seat; a valve riser affixed to such valve body and having an upper end; a valve stem concentrically disposed within such valve riser and having an upper portion and a lower portion; a first sealing means for assisting sealing at such valve seat, affixed to such lower portion of such valve stem and structured and arranged for engagement with such valve seat when such valve stem is lowered; a blocking means for implementing blocking of movement of such valve stem away from such valve seat, and an urging means for urging such first sealing means towards such valve seat; and a second sealing means, attached to such lower portion of such valve stem, for essentially preventing such fluid from contacting such urging means. And it provides such a system wherein such first sealing means is irremovably seated against such valve seat when such valve stem is blocked by such blocking means, whereby pressure testing capability is provided.

Additionally, in accordance with a preferred embodiment, this invention provides a multi-function unitary valve system for use with a valve having a valve seat, a valve washer, a valve stem, a valve riser, a rotary handle threadedly held by such valve riser, and a blocking element held by such rotary handle, and providing, for use in a fluid system containing a fluid, a pressure testing, pressure relief, and drain/test free fluid flow function, comprising the pressure testing steps of: manipulating such rotary handle until such valve washer is seated against such valve seat; affixing such blocking element in such rotary handle;

manipulating such blocking element until such blocking element contacts such valve stem;

pressurizing such fluid system to a pre-determined testing pressure; and manipulating such rotary handle, holding such blocking element, until such valve washer is displaced from such valve seat, whereby such pressure is relieved in such fluid system.

It further provides such a valve system wherein such controller comprises a receiver system structured and arranged to removably receive a valve-stem-movement blocker; and, also, further comprising a such valve-stem-movement blocker, removably affixable in such receiver system of such controller, structured and arranged to implement blocking of movement of such valve stem away from such valve seat. And it provides such a system wherein such outlet portion of such valve body comprises a downward facing faucet opening; and, further, wherein such valve riser comprises an integral element of such valve body; and, further, wherein such outlet portion of such valve body comprises a downward facing faucet opening; and, further, wherein said controller comprises an approximately round cylindrical outer surface having indentations structured and arranged to assist a user to grip such controller for turning such controller. It also provides such a system further comprising an adjuster, disposed within such internal bore, structured and arranged to adjust such urger.

Moreover, according to a preferred embodiment thereof, this invention provides a multi-function unitary valve system for use in a fluid system containing a fluid and having pressure testing, pressure relief, and drain/test free fluid flow capability, comprising, in combination: a valve body having an inlet portion, an outlet portion, and a valve seat; a valve riser affixed to such valve body and having an upper end; a valve stem concentrically disposed within such valve riser and having an upper portion and a lower portion; a first sealer, to assist sealing at such valve seat, affixed to such lower portion of such valve stem and structured and arranged for engagement with such valve seat when such valve stem is lowered; a blocker system structured and arranged to assist implementation of blocking of movement of such valve stem away from such valve seat; an urger structured and arranged to urge such first sealer towards such valve seat; and a second sealer, attached to such lower portion of such valve stem, structured and arranged to essentially prevent such fluid from contacting such urger.

Further, it provides such a system wherein such blocker system comprises a blocker element removably affixable in such valve system; and, also, further comprising a controller, adjustably attached to such valve riser, structured and arranged to implement raising and lowering of such valve stem, wherein such controller is structured and arranged to removably receive such blocker element; and, further, wherein such valve riser comprises an integral element of such valve body; and, further, wherein such outlet portion of such valve body comprises a downward facing faucet opening; and, further, wherein such controller comprises an approximately round cylindrical outer surface having indentations structured and arranged to assist a user to grip such controller for turning such controller.

Yet in addition, according to a preferred embodiment thereof, this invention provides a riser of the type connecting a water supply pipe of a structure to a sprinkler system pipe of the structure comprising, in combination: a first longitudinal pipe, having a first end and a second end, structured and arranged to connect to the water supply pipe at such first end and to the sprinkler system pipe at such second end; and extending transversely from such longitudinal pipe and all aligned in parallel relation along a first side of such longitudinal pipe, multiple ports, each such port being structured and arranged to attach to at least one sprinkler system component having at least one capability selected from the group consisting of safety capabilities, test capabilities, and monitoring capabilities.

Also, it provides such a riser further comprising, extending transversely from such first longitudinal pipe along a second side of such longitudinal pipe about 180 degrees opposed to such first side, a support, directly attached to such first longitudinal pipe, structured and arranged to assist attachment of such riser to the structure. And it provides such a riser wherein each such port is structured and arranged to attach to at least one sprinkler system component having at least one of the following capabilities: a flow-switch capability for monitoring delivery of the water flow to sprinklers of the sprinkler system;

a test-and-drain-valve capability for testing and draining the sprinkler system; a pressure-gauge capability for monitoring water pressure in the sprinkler system; a relief-valve capability for providing over-pressure relief for the sprinkler system. It also provides such a system wherein such port nearest such first end of such longitudinal pipe is structured and arranged to assist attachment to a flow switch; and, further, wherein said first longitudinal pipe is no more than about thirteen inches long; and, further, wherein said first longitudinal pipe is no more than about eleven inches long. And it provides such a riser wherein such port nearest such first end of such first longitudinal pipe comprises a flange connection structured and arranged to assist direct no-pipe-thread attachment of a flow switch.

It further provides such a riser wherein such flange connection is constructed and arranged for direct no-pipe-thread attachment of a flow switch of the type comprising a housing including a face plate, a sensing switch within the housing, a sensing paddle outside the housing and connected by a connector member through the face plate to the sensing switch, screw attachments for connecting the face plate to a flange member, and a cylindrical seal member, co-axial with the sensing paddle and encircling the connector member, for sealing a face-plate-to-flange-member connection. And it provides such a riser wherein such flange connection comprises: a flange; a smooth female bore central to such flange of such flange connection; wherein such flange comprises at least two flange connectors each structured and arranged to assist a connection to the flow meter. And it provides such a riser wherein such flange connection comprises:

a flange; a male hollow round cylinder element extending outwardly and centrally from such flange; wherein such male hollow round cylinder element comprises at least one external sealer structured and arranged to seal a flow meter of the type comprising a female bore connector;

wherein such flange comprises at least two flange connectors each structured and arranged to assist a connection to the flow meter. It also provides such a riser wherein such flange connection comprises: a flange; wherein such flange comprises external threads structured and arranged to match internal threads of a flow meter connection element; and wherein an outer face of such flange comprises a flat surface structured and arranged for sealing against a face of the flow meter connection element.

Furthermore, it provides such a riser wherein such multiple ports comprises three such ports in the following order in a direction from such first end of such first longitudinal pipe to such second end of such first longitudinal pipe: a first such port structured and arranged to attach to at least one sprinkler system component having at least a flow-switch capability for monitoring delivery of the water flow to sprinklers of the sprinkler system; a second such port structured and arranged to attach to at least one sprinkler system component having at least a test-and-drain-valve capability for testing and draining the sprinkler system and a relief-valve capability for providing over-pressure relief for the sprinkler system; a third such port structured and arranged to attach to at least one sprinkler system component having at least a pressuregauge capability for monitoring water pressure in the sprinkler system.

It also provides such a riser wherein such multiple ports comprises two such ports in the following order in a direction from such first end of such first longitudinal pipe to such second end of such first longitudinal pipe: a first such port structured and arranged to attach to at least one sprinkler system component having at least a flow-switch capability for monitoring delivery of the water flow to sprinklers of the sprinkler system; a second such port structured and arranged to attach to at least two sprinkler system components each having at least one of the following capabilities: a test-and-drain-valve capability for testing and draining the sprinkler system, a relief-valve capability for providing over-pressure relief for the sprinkler system, a pressure-gauge capability for monitoring water pressure in the sprinkler system. It also provides such a riser wherein such second port is structured and arranged to attach to two sprinkler system components: a first sprinkler system component having a pressure-gauge capability for monitoring water pressure in the sprinkler system; and a second sprinkler system component having a test-and-drain-valve capability for testing and draining the sprinkler system, and a relief-valve capability for providing over-pressure relief for the sprinkler system.

Yet in addition, it provides such a riser wherein such second port comprises a second longitudinal pipe extending from and perpendicular to such first longitudinal pipe and wherein such second longitudinal pipe comprises two component attachment structures: a first component attachment structure suitable to assist in attaching a pressure gauge for monitoring water pressure in the sprinkler system; and a second component attachment structure suitable to assist in attaching a valve having at least a test-and-drain-valve capability for testing and draining the sprinkler system; and, further, wherein such riser comprises a molded plastic; and, further, wherein such riser comprises essentially CPVC. It also provides such a riser further comprising: at about 90 degrees from such first side of such longitudinal pipe, first indict indicating a water flow direction and second indict indicating port identifications; and at about 270 degrees from such first side of such longitudinal pipe, third indict indicating a water flow direction and fourth indict indicating port identifications; said indict comprising symbols raised above a surface level of such riser. It also provides such a riser wherein such support comprises pedestal means including mounting flange means comprising a mounting hole for assisting attachment of such unitary means to such structure; and, further, wherein such mounting hole is slanted away at an acute angle from a direction perpendicular to such longitudinal pipe.

Moreover, according to a preferred embodiment thereof, this invention provides a sprinkler system riser unit for supplying water from a water supply pipe of a structure to a sprinkler system pipe of such structure comprising, in combination: a first longitudinal pipe, having a first end and a second end, structured and arranged to connect to the water supply pipe at such first end and to the sprinkler system pipe at such second end; and extending transversely from such longitudinal pipe and all aligned in parallel relation along a first side of such longitudinal pipe, multiple ports, each such port being structured and arranged to attach to at least one sprinkler system component having at least one capability selected from the group consisting of safety capabilities, test capabilities, and monitoring capabilities; extending transversely from such first longitudinal pipe along a second side of such longitudinal pipe about 180 degrees opposed to such first side, a support, directly attached to such first longitudinal pipe, structured and arranged to assist attachment of such riser to the structure; wherein each such port is structured and arranged to attach to at least one sprinkler system component having at least one of the following capabilities: a flow-switch capability for monitoring delivery of the water flow to sprinklers of the sprinkler system; a test-and-drain-valve capability for testing and draining the sprinkler system; a pressure-gauge capability for monitoring water pressure in the sprinkler system; a relief-valve capability for providing over-pressure relief for the sprinkler system; wherein such port nearest such first end of such longitudinal pipe is structured and arranged to assist attachment to a flow switch; and attached to such riser, the following such sprinkler system components: a flow switch to monitor delivery of water flow to sprinklers of the sprinkler system; a multipurpose valve comprising a test and drain valve to test and drain the sprinkler system, such test and drain valve including a relief valve to provide over-pressure relief for the sprinkler system; a pressure gauge to monitor water pressure in the sprinkler system.

And it provides such a riser unit wherein such multipurpose valve comprises, in combination: a valve body having an inlet portion, an outlet portion, and a valve seat; a valve riser affixed to such valve body and having an upper end; a valve stem concentrically disposed within such valve riser and having an upper portion and a lower portion; a first sealer, to assist sealing at such valve seat, affixed to such lower portion of such valve stem and structured and arranged for engagement with such valve seat when such valve stem is lowered; a blocker system structured and arranged to assist implementation of blocking of movement of such valve stem away from such valve seat; and an urger structured and arranged to urge such first sealer towards such valve seat. And it provides such a riser unit wherein said multipurpose valve further comprises a second sealer, attached to such lower portion of such valve stem, structured and arranged to essentially prevent such fluid from contacting such urger.

It further provides such a riser manifold unitary means wherein such riser manifold unitary means is constructed essentially of a molded plastic material; and, further, wherein such riser manifold unitary means is constructed essentially of a molded CPVC material.

Also, according to a preferred embodiment thereof, this invention provides, in a system for connecting a flow switch to a longitudinal pipe for monitoring water flow through such longitudinal pipe, such flow switch being of the type comprising a housing including a face plate, a sensing switch within such housing, a sensing paddle outside such housing and connected by a connector member through such face plate to such sensing switch, screw attachments for connecting such face plate to a flange member, and a cylindrical seal member, co-axial with such sensing paddle and encircling such connector member, for sealing such face-plate-to-flange connection, the steps of: providing an attachment pipe extending transversely from such longitudinal pipe along a first side of such longitudinal pipe, such attachment pipe comprising, at an outer end of such attachment pipe, a flange, comprising a cylindrical counterbore co-axial with such attachment pipe, for direct no-pipe-thread attachment of such flow switch to such attachment pipe in such manner that such flow switch may monitor water flow through such longitudinal pipe; providing a such disassembled such flow switch with such face plate, such sensing paddle and connector member, and such seal member; inserting such sensing paddle through such counterbore into such attachment pipe in such manner that such seal member rests essentially within such counterbore; connecting such face plate to such flange with such screw attachments in such manner as to seal such face-plate-to-flange connection with such sensing paddle in place for such monitoring and permit such connector member to pass through such face plate in position for connection to such sensing switch; reconnecting such connector member to such sensing switch; and reconnecting such housing to reassemble such flow switch.

BRIEF DESCRIPTION OF THE DRAWINGS

FIG. 3 is a front view, partially in section, of a matching embodiment of the flow meter switch attachment to the riser manifold flow meter port of a preferred embodiment of the present invention.

FIG. 4 is a cross-sectional plan view of the embodiment of FIG. 3.

FIG. 5 is a perspective view of another embodiment of the riser manifold flow meter port of the sprinkler system riser unit of the present invention.

FIG. 6 is a cross-sectional plan view of the embodiment of FIG. 5, showing also the connector parts of a matching flow meter.

FIG. 7 is a perspective view of yet another preferred embodiment of the riser manifold flow meter port of the sprinkler system riser unit of the present invention.

FIG. 8 is cross-sectional plan view of the embodiment of FIG. 7, showing also the connector parts of a matching flow meter.

FIG. 9 is a perspective view of another preferred embodiment of a riser manifold according to the present invention, with a preferred embodiment of a test, drain and pressure relief valve attached.

FIG. 10 is an exploded view of the test, drain and pressure relief valve major components according to a preferred embodiment of the present invention illustrated in FIG. 9.

FIG. 11 is a cross-sectional view of the test, drain and pressure relief valve embodiment illustrated in FIG. 9.

FIG. 12 is an exploded view of another preferred embodiment of the test, drain and pressure relief valve components of the present invention as illustrated in FIG. 1

FIG. 13 is a cross sectional view of the test, drain and pressure relief valve embodiment illustrated in FIGS. 1 and 12.

DETAILED DESCRIPTION OF A PREFERRED EMBODIMENT AND THE BEST MODE OF PRACTICE

Figures 1, 2:
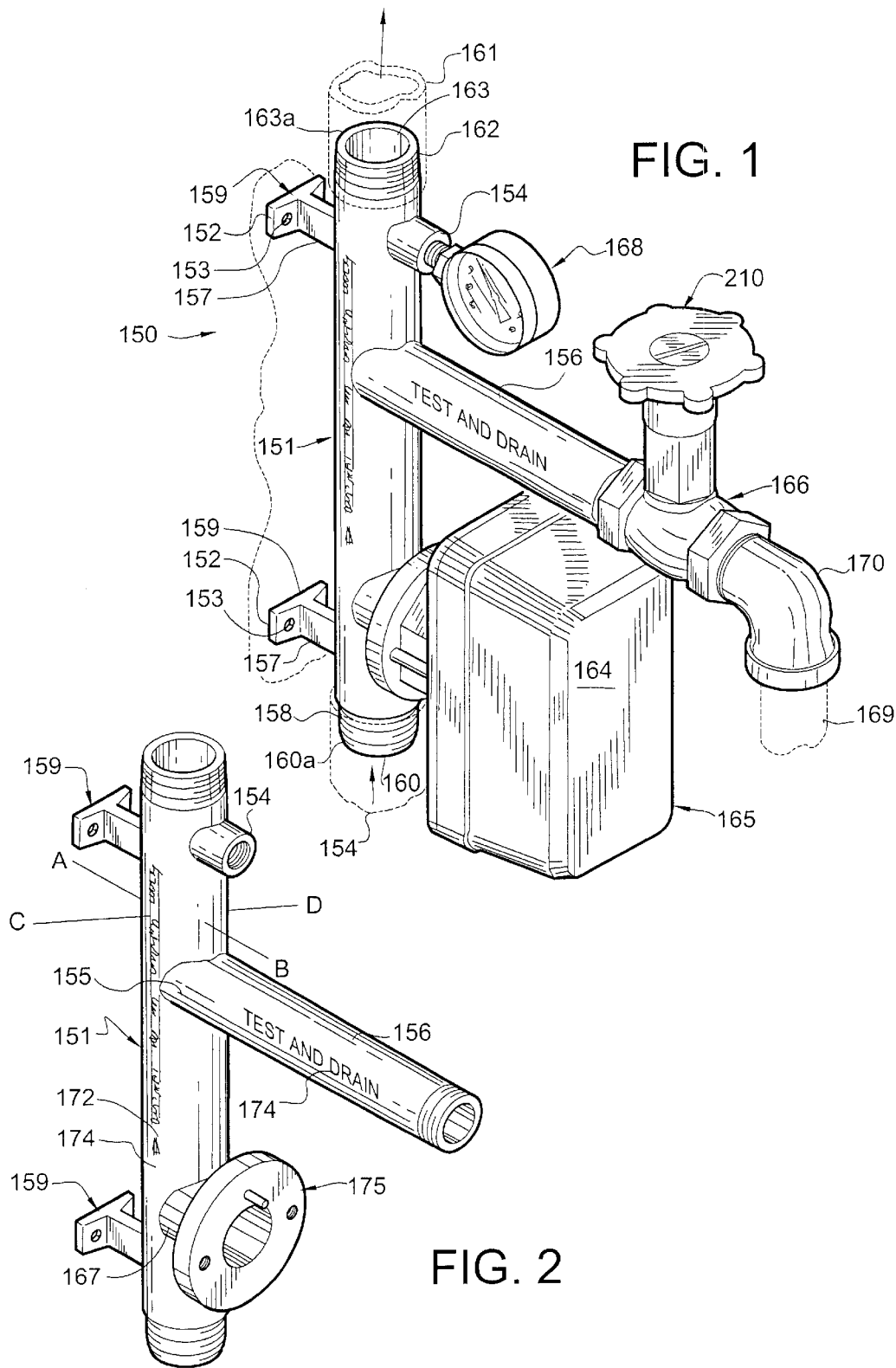
FIG. 1 is a perspective view of a preferred embodiment of the sprinkler system riser unit of the present invention, showing sprinkler system components attached.
FIG. 2 is a perspective view of the riser manifold (riser) of the preferred embodiment of FIG. 1 without components attached.

Shown in FIG. 1 is a perspective view of a preferred embodiment of the sprinkler system riser unit of the present invention illustrated as preferably connected (with attached components) in a residential structure; and FIG. 2 is a perspective view of a preferred embodiment of the sprinkler system riser manifold only. With particular reference to FIG. 1, the riser unit 150 is preferably a component of a water sprinkler system for a residential fire protection system. The riser unit 150 includes components used for monitoring delivery of water to the sprinklers, monitoring water pressure, providing system over-pressure relief, and testing and draining the water sprinkler system. Riser unit 150 incorporates a riser manifold unitary means embodied by the one-piece manifold 151 to assist in making connections to the above-mentioned components as well as water system connections, all as hereinafter described.

Manifold 151 incorporates support means (for assisting attachment of the riser manifold unitary means to the structure) embodied by two pedestals 152 for stabilizing of the riser unit 150 by attachment of the riser unit 150 to a convenient location of the residence's structure. The riser unit 150 connects the residence's water piping to the sprinkler system by two connections onto manifold 151: to connect to inlet means embodied by water supply pipe 154 and standard pipe coupling 158 at the inlet 160; and to connect to outlet means embodied by sprinkler plumbing pipe 161 and standard pipe coupling 162 at the outlet 163. Other suitable fittings may be used. Manifold 151 includes pipe thread attachment locations (on its side facing direction B, as shown in FIG. 2) for system components as illustrated: flow switch means embodied by flow switch 165; test, drain and relief valve means embodied by test, drain and relief valve 166; pressure gauge means embodied by pressure gauge 168. There are also connections to riser unit 150 of a drain pipe 169 at drain connection means embodied by elbow-fitting 170.

With particular reference to FIG. 2 and continued reference to FIG. 1, the riser unit 150 includes means for conveniently grouping, connecting and securely mounting various components of a fire prevention water sprinkler system. Although water sprinkler systems are custom tailored for each application with a varying quantity of sprinkler heads and a varying layout of interconnecting plumbing, the system components of riser unit 150 remain reasonably consistent with most applications; and the teachings of the present invention will apply even if in a particular application only two ports for the described system components are cast into manifold 151 (as embodied and further shown in FIG. 9). The functioning of all the preferred components is as follows. A pressure gauge 168 indicates the pressure within the system and is monitored for indication that ample pressure is available in the event that the sprinklers will be activated. Over-pressurization of a closed system can occur, from thermal expansion or other reasons. In a preferred embodiment of the present invention, a multi-function unitary valve system for providing pressure test, pressure relief, and drain/test fluid flow capability is provided and illustrated in FIG. 12 and FIG. 13. An alternate embodiment of the multi-function unitary valve system for providing pressure test, pressure relief, and drain/test fluid flow capability is provided and illustrated in FIG. 9, FIG. 10 and FIG. 11.

Referring now to FIG. 13, valve 180, is shown in cross-sectional view. Valve 180 consists of a standard globe valve body 182 (well-known to those skilled in the art) of a predetermined size (readily selectable by those skilled in the art) and having a fluid inlet side 183, a fluid outlet side 184 and having an internally threaded upper portion 186. Disposed within the valve body 182 is a valve seat 187 which is structured and arranged to engage a valve washer 188. The valve washer 188 is preferably attached to valve stem 190 by use of a metal screw 192 which is sized and arranged to engage an internally threaded recess 193 disposed within the bottom end 194 of valve stem 190 (preferably made of brass). The screw 192 is further secured to the valve stem 190 with the use of a screw thread locking product, preferably the product known as "Loctite" (™) (preferably product #271 available from Loctite Corporation of Newington, Conn.)]. Also, as shown in FIG. 10, the use of a lock washer 319, of the type readily selectable by one skilled in such art, is preferably used to further secure the screw to the valve stem 316 (and 190 in FIG. 13).

To accomplish pressure relief capability, valve 180 incorporates the use of a valve stem helical spring 196 which exerts a predetermined pressure on the valve stem bottom end 194 and the valve washer 188. The valve stem helical spring 196 embodies herein an urging means for urging such valve washer towards such valve seat 187; and it also embodies an urger structured and arranged to urge such first sealer towards such valve seat. The predetermined pressure is that pressure which is required to maintain the valve washer 188 against the valve seat 187 during standard fire sprinkler system operating pressure. The "not to exceed" predetermined pressure for fire sprinkler water systems is typically 175 psi. Upon a given fire suppression system exceeding this predetermined pressure, valve washer 188 will be displaced (provided that valve stem 190 is not otherwise blocked from moving) from the valve seat 187 thereby relieving system pressure (by releasing pressurized system fluid through fluid outlet side 184) and thus preventing damage to the system components. When the system pressure has returned to the operating "not to exceed" pressure, spring 196 automatically urges valve washer 188 against valve seat 187 thereby sealing the system from further fluid loss.

Also shown in FIG. 13 is a valve riser 198, preferably made of a metal material (brass), and having a threaded upper portion 199, a threaded lower portion 200, and having an internal bore portion 202 therein. The threaded lower portion 200 of valve riser 198 is sized to frictionally engage the internally threaded upper portion 186 of valve body 182. To assist in maintaining a tight connection between valve riser 198 and valve body 182, a thread tightening product, preferably "Loctite" (TM), may be applied to the threaded lower portion 200 of valve riser 198 and the internally threaded upper portion 186 of valve body 182. Internal bore portion 202 comprises a first bore section 204 and a second bore section 205. As shown in FIG. 13, first bore section 204 has a diameter greater than the second bore section 205 which is necessary to house spring 196 as shown. The second bore section 205 is sized so as to allow for unobstructed movement of the valve stem 190 therein when the valve is arranged for pressure relief capability (locking plug 208 not installed). As FIG. 13 further illustrates, the present invention also provides for a valve handle 210, preferably of the rotary type and preferably made of a metal material. Valve handle 210 comprises a lower portion 211 having a lower internally threaded recess 212, and an upper portion 214 having an upper internally threaded recess 215. Separating each respective recess 212 and 215 is a center portion 216 having an axial hole 218 sized so as to allow unobstructed movement of valve stem 190 therein when valve 180 is arranged for pressure relief capability. The lower internally threaded recess 212 of valve handle 210 is structured and arranged for adjustable attachment to the threaded upper portion 199 of valve riser 198. In operation, opening of valve 180 consists of manipulating the valve handle 210 (preferably by manually turning valve handle 210 counterclockwise) until the valve washer 188 is displaced from the valve seat 187. To facilitate lifting of the valve stem 190, a threaded fastener (preferably a stem bolt 220 as further shown in FIG. 12) is attached, preferably by threaded attachment, to the valve stem upper portion 222 (preferably having a threaded portion). Preferably stem bolt 220 also secures a washer 221 and a substantially annular tension disk 224, preferably consisting of a metal material and having a preferred thickness of about ¼ inch, for use in adjusting the tension on spring 196 so as to more thoroughly ensure that when-the system pressure achieves the above mentioned "not-to-exceed" system pressure, the valve washer 188 is displaced from the valve seat 187. Stem bolt 220 embodies herein an engagement means, structured and arranged for attachment adjacent such upper portion of such valve stem, for engaging such control means; and it also embodies an engaging element, structured and arranged to attach to such valve stem adjacent such upper portion of such valve stem and to engage such controller.

As shown in perspective in FIG. 12, the tension disk 224 is provided with a concentric aperture 225, sized to allow unobstructed movement of valve stem 190 therethrough, and is further provided with substantially cylindrical outer surface threaded portion 235 which is structured and arranged to engage the valve riser upper portion 199. Preferably, adjusting the tension in spring 196 consists of engaging the outer surface threaded portion 235 with the valve riser upper portion 199 and turning (in well known ways) the tension disk 224 so that it recedes into the internal bore portion 202. When so positioned, the planar bottom surface 236 of tension disk 224 is in contact with the top coil 238 of spring 196, as shown in FIG. 12. Subsequent such turns of the tension disk 224 results in further compression of spring 196 (with a resultant increase in spring tension) resulting in a corresponding increase in the system pressure required to unseat the valve washer 188 from the valve seat 187. The tension disk 224 embodies herein an adjustment means, disposed within such internal bore, for adjusting such urging of such urging means; and it also embodies an adjuster, disposed within said internal bore, structured and arranged to adjust said urger. To avoid accidental or unauthorized adjustment of the tension in spring 196, it is preferred (and often required by applicable safety codes) that spring 196 be factory adjusted prior to installing the valve 180 in the particular fluid system and that the tension disk 224 be secured after adjustment by a suitable thread tightening product, preferably the aforementioned Loctite (™) product. To prevent fluid from escaping around valve stem 190 when the valve 180 is in an open position, an O-ring-type gasket 226, of the kind readily selectable by one with ordinary skill in such art, is attached to a circumferential groove 228 on valve stem 190, as shown in FIG. 12.

Preferably, in one embodiment the valve 180 may also be structured and arranged to pressure test fire suppression systems as described below. Typically, hydrostatic pressure testing is required in piping systems in order to ascertain the integrity of such systems against leakage and/or faulty components. Commercial fire sprinkler systems typically require a test pressure of approximately 200 psi. Since the test pressure typically exceeds the system pressure which will activate the pressure relief function, this embodiment provides for a blocking plug 208 which is structured and arranged to block movement of the valve stem 190 when the system "not to exceed" pressure is exceeded. The blocking plug 208 is preferably made of a metal material and has a bottom surface 229, a plug upper portion 230 with a slot 232 for adjustment and a cylindrical externally threaded plug lower portion 231. Obtaining pressure test capability is achieved by simply turning valve handle 210 until valve washer 188 is seated against valve seat 187. The blocking plug 208 is then installed in valve handle 210 by attaching, preferably by a threaded attachment, the externally threaded plug lower portion 231 to the upper internally threaded recess 215 of valve handle 210. When properly installed, the bottom surface 229 of blocking plug 208 is seated against the valve stem top surface 234 as shown in FIG. 13.

To facilitate installation of blocking plug 208, the plug upper portion 230 has, for example, as shown, a slot sized to fit a typical flat end screwdriver. Upon completion of the pressure test, relieving the fire suppression system of excess pressure consists of simply turning the valve handle 210 until the valve washer 188 is displaced from the valve seat 187 thereby allowing the pressurized fluid to escape through the fluid outlet side 184. The use of the blocking plug 208 has the further advantage of maintaining the stem upper portion 222 disposed within the upper internal threaded recess 215 of valve handle 210 when the user is attempting to alleviate system pressure. This arrangement effectively prevents the sudden movement of the valve stem 190 which may come into contact and injure the hand of the user.

Preferably valve 180 may be arranged for drain/test fluid flow capability which is necessary to either drain the fire suppression system or to check the integrity of the alarm system. As hereinbefore discussed with respect to FIG. 13, opening of valve 180 consists of manipulating the valve handle 210 (preferably by manually turning valve handle 210 counterclockwise). As the threads on the lower internally threaded recess 212 travel along the corresponding threads on the threaded upper portion 199 of valve riser 198, the valve handle 210 rises (defined as the movement of valve handle 210 away from the valve body 182). Continued turning of valve handle 210 causes handle center portion 216 to exert pressure on washer 221 and stem bolt 220 thereby raising the valve stem 190 which, in turn, causes the valve washer 188 to become displaced from the valve seat 187. Closing of valve 180 consists of manipulating the valve handle 210 (preferably by manually turning valve handle 210 clockwise) thereby lowering valve handle 210 (defined as movement of valve handle 210 towards the valve body 182) and thus allowing the tensile force in spring 196 to urge the valve washer 188 against the valve seat 187. A further advantage of the present invention is that the valve handle 210 may be operated to open and close the valve 180 even with the blocking plug 208 installed. As hereinbefore discussed, this arrangement is beneficial in preventing injury to the user when the user attempts to alleviate system pressure following a pressure test. Further, the use of threaded portions on the valve riser 198 and valve handle 210 allows for gradual and smooth opening and closing of valve 180. This arrangement is helpful in preventing the "water hammer" effect which is caused when a flow of fluid through a fluid system is suddenly halted thereby creating a reverberating pressure wave in the fluid which may result in system damage.

Installation of valve 180 preferably comprises threaded attachment of valve body to conveniently accessible portion of the test and drain piping 156 (FIG. 1), preferably comprising threaded pipe, from which the fire suppression fluid is removed from the fire suppression system to either drain the system or check the alarm system integrity.

Referring further to FIG. 12, the details of the valve stem 190 of the present embodiment will now be disclosed. The valve stem 190 is preferably made of a metal material and comprises a substantially cylindrical upper stem portion 240 and a substantially cylindrical lower stem portion 242 having a lower stem ledge portion 244 sized to support the lower coil 245 of spring 196. As shown, valve stem 190 is structured so that the upper stem portion 240 has a smaller diameter than the lower stem portion 242. The lower stem portion 242 is provided with a groove 228 structured and arranged to receive a typical O-ring-type gasket 226, preferably comprising an essentially rubber material. The valve stem 190 is sized and arranged for concentric placement within the internal bore portion 202 such that the lower stem portion 242 is adjacent the lower inner riser portion 213 of valve riser 198. When the valve stem 190 is structured and arranged in the above-mentioned fashion, the O-ring gasket 226 always remains in contact with the lower inner riser portion 213 of valve riser 198 even when the valve washer 188 is fully a displaced from the valve seat 187. This arrangement advantageously serves the purpose of effectively insulating the spring from the system fluid, thereby prolonging the life of spring 190. The O-ring gasket 226 embodies herein a second sealing means, attached to such lower portion of such valve stem between such helical spring and such valve seat, for essentially preventing such fluid from contacting such helical spring; and it also embodies herein a second sealer, attached to such lower portion of such valve stem, structured and arranged to essentially prevent such fluid from contacting such urger.

To provide a means to manually raise valve stem 190, the valve 180 is provided with an annular washer 221, of a type well known in such art, which is structured and arranged to engage handle center portion 216 when the valve 180 is manually opened in accordance with the aforementioned disclosure accompanying FIG. 13. As shown in FIG. 12, the annular washer 221 is secured to the top surface 234 of valve stem 190 by use of a stem bolt 220 fastener, preferably, a threaded fastener, which is structured and arranged for receipt by the stem upper threaded recess 237. To prevent system fluid from escaping past valve seat 187 when valve 180 is in a closed position, the present embodiment of valve 180 is provided with a lower stem ledge 247 structured and arranged to be integrally attached adjacent the lower valve stem portion 242 of valve stem 190. Lower stem ledge 247 comprises a foot 241, preferably comprising a metal material, having a substantially planar bottom end 194 sized to receive valve washer 188. The valve washer 188, preferably comprising a rubber-type material, is secured to the foot 241 with a metal screw fastener 192, preferably comprising a threaded fastener.

Preferably, configuring valve 180 for pressure test capability is achieved by simply turning valve handle 210 until the valve washer 188 is seated against valve seat 187 (such as shown in FIG. 13). The blocking plug 208 is then installed in valve handle 210 by attaching, preferably by a threaded attachment, the externally threaded body 231 to the upper internally threaded recess 215 of valve handle 210. When properly installed, the planar bottom surface 229 of blocking plug 208 is seated against the head top surface 223 of fastener, stem bolt 220. To facilitate attachment of the blocking plug 208 in the aforementioned manner, slot 232 is provided in the plug upper portion 230 which is structured and arranged to receive the flat edge of a screwdriver or like device.

Referring now to FIG. 1 and FIG. 2, incorporated on riser unit 150 is a flow switch 165 which utilizes its included sensing paddle 171 (as shown in FIG. 3) to monitor water flow within the interior of manifold 151. In the event of sprinkler activation (or testing), water flow through riser unit 150 is recognized by flow switch 165 which activates its integral electrical contacts and sends an electrical signal through attached wiring (not shown). This electrical signal may typically then be used to actuate an alarm or bell within the residence and may additionally be used to notify a fire station.

To functionally connect these components together, manifold 151 is provided. Manifold 151 is a one-piece casting, preferably with standard pipe thread connections at inlet 160, outlet 163, pressure gauge port 154, and test and drain port 155, preferably as shown in FIG. 2. Flow switch port 167 encompasses several embodiments further described below. The two pedestals 152 for mounting the manifold 151 are preferably cast integrally with mounting holes 153 provided, as shown. The longitudinal pipe means for guiding water flow from the water supply pipe to the sprinkler system pipe is embodied by manifold 151 which extends from a first end 160a at inlet 160 to a second end 163a at outlet 163, both of which outlets preferably have standard male, external pipe threads sized one inch N.P.T. (embodying herein also a first longitudinal pipe, having a first end and a second end, structured and arranged to connect to the water supply pipe at such first end and to the sprinkler system pipe at such second end). Located on manifold 151 (on its side facing direction C, see especially FIG. 2), at about 90 degrees from the first-mentioned side (facing direction B, hereinafter sometimes called side B) of manifold 151, are first indicia, embodied by arrow 172, indicating a water flow direction, and second indicia, embodied by port identifications 174, indicating port identifications. Also located on manifold 151 (on its side facing in direction D, sometimes hereinafter called side D), at about 270 degrees from first side B of manifold 151, are third indicia (similar to said first indicia) indicating a water flow direction and fourth indicia (similar to said second indicia) indicating port identifications. All these just-mentioned indicia preferably comprise symbols raised above a surface level of manifold 151. Port identifications 174 are preferably worded GAUGE, TEST & DRAIN, and FLOW. Port identification 174 located at flow switch port 167 additionally preferably has adjacent to it arrow 172 indicating direction of water flow within the manifold 151, as shown. Additional indicia 173 cast into manifold 151 might include trade name and mark, part numbering, patent numbering, manufacturer, and phone number, etc.

A perspective view of manifold 151 is shown in FIG. 2. The manifold 151 is preferably tubular in cross-section and preferably hollow its full length. Extending transversely (perpendicularly) from the longitudinal pipe means of manifold 151 and aligned in parallel relation along a first side B of manifold 151 are multiple pipe thread attachment means for attaching sprinkler system components to manifold 151, such attachment means being embodied by: pressure gauge port 154 which preferably has internal pipe threads sized one-quarter inch N.P.T.; flow switch port 167 which preferably has multiple embodiments as described below, and test, drain valve and relief port 155 which preferably has external pipe threads sized one-half inch N.P.T. It is noted that, although such test, drain and relief valve ports are usually female and internal, the casting in manifold 151 of male, external threads for such port provides an efficient and direct connection to the usual test, drain and relief valve (i.e., it saves requiring a nipple to be added to the port). This arrangement also embodies herein that, extending transversely from such longitudinal pipe and all aligned in parallel relation along a first side of such longitudinal pipe, there are multiple ports, each such port being structured and arranged to attach to at least one sprinkler system component having at least one capability selected from the group consisting of safety capabilities, test capabilities, and monitoring capabilities. And it embodies also such a system wherein each such port is structured and arranged to attach to at least one sprinkler system component having at least one of the following capabilities: a flow-switch capability for monitoring delivery of the water flow to sprinklers of the sprinkler system; a test-and-drain-valve capability for testing and draining the sprinkler system; a pressure-gauge capability for monitoring water pressure in the sprinkler system; a relief-valve capability for providing over-pressure relief for the sprinkler system. And it further embodies a riser wherein such multiple ports comprises three such ports in the following order in a direction from such first end of such first longitudinal pipe to such second end of such first longitudinal pipe: a first such port structured and arranged to attach to at least one sprinkler system component having at least a flow-switch capability for monitoring delivery of the water flow to sprinklers of the sprinkler system; a second such port structured and arranged to attach to at least one sprinkler system component having at least a test-and-drain-valve capability for testing and draining the sprinkler system and a relief-valve capability for providing over-pressure relief for the sprinkler system; a third such port structured and arranged to attach to at least one sprinkler system component having at least a pressure-gauge capability for monitoring water pressure in the sprinkler system.

It is preferred (for embodiments like that of FIGS. 1 and 2) that the system components be attached to the pipe thread attachments of the ports of manifold 151 in the following order with respect to a direction from the first end 160a at the pipe threads of inlet 160 to the second end 163a at the pipe threads of outlet 163: flow switch means; test and drain and relief valve means; and pressure gauge means. Also preferred in combination, for the reasons herein for this described embodiment, are the following dimensions: for the length of manifold 151, about thirteen inches; for the location of the center of flow switch port 167 for flow switch 165, about three inches from first end 160a of manifold 151; for the location of the center of test and drain port 155 for test, drain and relief valve 166, about eight inches from first end 160a of manifold 151; and, for the location of the center of pressure gauge port 154 for pressure gauge 168, about eleven inches from first end 160a of manifold 151.

The above preferred dimensions provide high efficiency in use of space, etc. The largest diameter system component is usually the pressure gauge, usually about three and one-half inches in diameter. And the system component usually having longest longitudinal extension for its port center line is the flow switch, usually about three and $11/16$ inches. Considering all of the above and the importance and efficiency (in cost and space) of a minimum length riser while preserving the ability to install the riser manifold for support to either side, the herein illustrated and disclosed arrangement and dimensions are an important part of the present invention, according to a preferred embodiment thereof, and this arrangement embodies herein that said first longitudinal pipe is no more than about thirteen inches long.

Since the ports for the system components are all to one side (side B) of the manifold 151, and since the support connections, as for attachment to a beam of the residence, are all on the other side (the side facing in the direction A, hereinafter sometimes called side A) of the manifold 151, the manifold 151 may be connected facing either way, i.e., to a left support beam/wall or to a right support beam/wall. Furthermore, as indicated elsewhere herein, manifold 151 has indicia on both manifold "facing" sides for indicating flow direction and port identifications to a user from either side. Also, it is noted that a control means, embodied by handle 210, for operation of test, drain and relief valve 166 may be attached so that handle 210 is facing in the illustrated direction, i.e., on the side B of manifold 151.

Pedestals 152 are located on the side A (180 degrees from side B) of manifold 151 and oriented 180 degrees from the above-mentioned system component ports, as shown. Each pedestal 152 includes a mounting flange 159 attached to the manifold 151 by two stand-offs 157.

Manifold 151 is preferably cast in one piece (with all of its features included in the casting) preferably of a cast alloy material selected from the following group: brass, bronze, copper or plastic. A suitable plastic material, for example, the material called "CPVC Orange", approved for such uses, may preferably be used. Wall thickness of the riser manifold is generally relatively the same throughout and suitable for the water pressure used.

Several embodiments of the flow switch port 167 will now be described. FIG. 2 illustrates a preferred embodiment of the flow switch port 167. Manifold 151 incorporates a flanged port 167 for the mounting of flow switch 16 switch port (not shown) of manifold 151. Flow switch 165 may, depending upon the type of flow switch preferred, have several mounting embodiments and therefore multiple mounting embodiments of the flow switch mounting flange are described. The flanged port of manifold 151 includes a mounting flange 167, and is designed for direct mounting of flow switch 63, as shown.

In one preferred embodiment, the interface of flow switch 165 to the flanged port 167 of manifold 151 is mounting flange 175 which is illustrated further by FIG. 3 and FIG. 4. In this embodiment, the flow switch 165 mates and secures to mounting face 252 of mounting flange 254 with screws 250, as shown. Threaded holes 253 are provided in mounting flange 254 and are appropriately sized, spaced, and oriented to be compatible with the mounting requirements of flow switch 165. Mounting flange 254 also includes an equivalent and appropriately sized counterbore recess 258 with depths and diameters required for accepting the sensing paddle 171 and double O-ring seals 248 and 249 respectively of the flow switch "male" mounting flange 256. The flow switch 165 mounting flange 254 is embodied as the "female" connection. When mounting the flow switch 165 (shown in FIG. 1) to the manifold 151, the flow switch 165 must first be disassembled. The method of disassembly is well known by those skilled in the art. The sensing paddle 171 with O-ring seals 248 is inserted into the counterbore recess 258 of the mounting flange 252 with the sensing paddle 171 oriented perpendicular to the axis of the manifold 151. The flanged port 167 is then installed onto the flange face 252 of the mounting flange 254, which firmly sandwiches the O-ring seals 248 between the mounting flange 254 and the wall of the counterbore recess 258, thus retaining the sensing paddle 171. The flow switch may then be re-installed, and the cover 164 re-installed, all in a straightforward manner to those with ordinary skill in the art. This embodies a system for connecting a flow switch to a longitudinal pipe for monitoring water flow through such longitudinal pipe, such flow switch being of the type comprising a housing including a face plate, a sensing switch within such housing, a sensing paddle outside such housing and connected by a connector member through such face plate to such sensing switch, screw attachments for connecting such face plate to a flange member, and a cylindrical seal member, co-axial with such sensing paddle and encircling such connector member, for sealing such face-plate-to-flange connection, the steps of: providing an attachment pipe extending transversely from such longitudinal pipe along a first side of such longitudinal pipe, such attachment pipe comprising, at an outer end of such attachment pipe, a flange, comprising a cylindrical counterbore co-axial with such attachment pipe, for direct no-pipe-thread attachment of such flow switch to such attachment pipe in such manner that such flow switch may monitor water flow through such longitudinal pipe; providing a such disassembled such flow switch with such face plate, such sensing paddle and connector member, and such seal member; inserting such sensing paddle through such counterbore into such attachment pipe in such manner that such seal member rests essentially within such counterbore; connecting such face plate to such flange with such screw attachments in such manner as to seal such face-plate-to-flange connection with such sensing paddle in place for such monitoring and permit such connector member to pass through such face plate in position for connection to such sensing switch; reconnecting such connector member to such sensing switch; and reconnecting such housing to reassemble such flow switch.

FIG. 4 is a cross-sectional plan elevation view of flow switch connection shown in FIG. 3 installed on the mounting flange 254 of manifold 151. Preferably, the male mounting flange 256 flange face 260 mates and secures to mounting face 252 of mounting flange 254 with screws 250, as shown. Threaded holes 253 are provided in mounting flange 254 and are appropriately sized, spaced, and oriented, to be compatible with the mounting requirements of flow switch 165. Mounting flange 254 also includes an equivalent and appropriately-sized counterbore recess 258 with depths and diameters required for accepting the sensing paddle 171 and double O-ring seals 248 and 249 respectively of the flow switch "male" mounting flange 256. The flow switch 165 mounting flange 254 is embodied as the "female" connection. The sensing paddle 171 with O-ring seals 248 is inserted into the counterbore recess 258 of the mounting flange 252 with the sensing paddle 171 oriented perpendicular to the axis of the manifold 151. The flanged port 167 is then installed onto the flange face 252 of the mounting flange 254, which firmly sandwiches the O-ring seals 248 between the mounting flange 254 and the wall of the counterbore recess 258, thus retaining the sensing paddle 171. This arrangement embodies herein a flange connection constructed and arranged for direct no-pipe-thread attachment of a flow switch of the type comprising a housing including a face plate, a sensing switch within the housing, a sensing paddle outside the housing and connected by a connector member through the face plate to the sensing switch, screw attachments for connecting the face plate to a flange member, and a cylindrical seal member, co-axial with the sensing paddle and encircling the connector member, for sealing a face-plate-to-flange-member connection. The arrangement of FIGS. 3 and 4 also embodies herein such a flange connection comprising: a flange; a smooth female bore central to such flange of such flange connection; wherein such flange comprises at least two flange connectors each structured and arranged to assist a connection to the flow meter.

This last-discussed preferred embodiment of this invention, using a flanged mounting, provides many advantages over a pipe-threaded mounting. E.g., it provides a simple "bolt on" mounting, not requiring large wrenches or pipe thread sealing means, such as Teflon tape or pipe dope; it eliminates an unnecessary joint; it eliminates the need for the large specialty adapter/mounting fitting which is typically supplied with the flow switch; proper orientation of the flow switch is automatically established, as the flange is permanently located; and the switch does not need to be rotated to be installed, therefore its large housing doesn't require "extra" clearance from other nearby obstructions.

Another alternate preferred embodiment of the flow switch connection is illustrated in FIG. 5 and FIG. 6. In this embodiment, the flow switch 165 mates and secures to mounting face 266 of mounting flange 269 with screws 250, as shown. Threaded holes 253 are provided in mounting flange 269 and are appropriately sized, spaced, and oriented, to be compatible with the mounting requirements of flow switch 165. Mounting flange 269 also includes an equivalent and appropriately sized "male" connection 274, preferably cylindrical, preferably with double O-ring seals 263 and 264 set in grooves 275 and 276. The flow switch 165 mounting flange 271 is embodied as the "female" connection. When mounting the flow switch 165 (shown in FIG. 6), the sensing paddle 267 is inserted into the counterbore recess 262 of the mounting flange 269 with the sensing paddle 267 oriented perpendicular to the axis of the manifold 151. The flanged port 262 is then installed onto the male connection 274 and attached at the flange face 266 of the mounting flange 269, which firmly sandwiches the O-ring seals 263 and 264 between the mounting flange 269 and the wall of the counterbore recess 262, thus retaining the sensing paddle 267 and providing a seal in the counterbore recess 262 of the flow switch 165. This arrangement embodies herein a such flange connection comprising: a flange; a male hollow round cylinder element extending outwardly and centrally from such flange; wherein such male hollow round cylinder element comprises at least one external sealer structured and arranged to seal a flow meter of the type comprising a female bore connector; wherein such flange comprises at least two flange connectors each structured and arranged to assist a connection to the flow meter.

Yet another preferred embodiment of the flow switch 165 connection is illustrated in FIG. 7 AND FIG. 8. Preferably a flow switch attachment is made with a screw thread 280 type attachment as shown in FIG. 7. Manifold 151 has an attached port 278 protruding from manifold 151 with exterior screw threads 280. Preferably the screw threads 280 are "buttress" type threads that form a compressive seal when a matching screw thread nut 286 is attached as shown in FIG. 8. In this embodiment of the flow switch 165 connection, the flow switch has a matching "female" screw thread nut 286 adapter to fit the screw threads 280 of the manifold 151 of the riser unit 150 (shown in FIG. 2). Preferably, when the flow switch 165 is installed on the riser manifold 151 screw threads 280, the flow switch 165 mates and secures to mounting face 282 of mounting flange 289 with a compression fit, as illustrated in FIG. 8. An O-ring 288 set in a groove 293 at the face 290 of the flow meter flange 292 forms a seal as it is compressed against the flange face 282 of the mounting flange 279. When mounting the flow switch 165 (shown in FIG. 8), the sensing paddle 294 is inserted into the internal bore recess 284 of the mounting flange 279 with the sensing paddle 290 oriented perpendicular to the axis of the manifold 151. The threaded port 278 is then installed onto the female connection screw nut 286 and attached at the flange face 282 of the mounting flange 279, which firmly sandwiches the O-ring seal 288 between the mounting flange 279 and the face 290 of the flow meter flange 292, thus retaining the sensing paddle 294 and providing a seal. This arrangement embodies herein a such flange connection comprising: a flange; wherein such flange comprises external threads structured and arranged to match internal threads of a flow meter connection element; and wherein an outer face of such flange comprises a flat surface structured and arranged for sealing against a face of the flow meter connection element.

FIG. 9 illustrates yet another preferred embodiment of the riser unit 300. With particular reference to FIG. 9, the riser unit 300 is a component of a water sprinkler system for a residential fire protection system similar to that illustrated in FIG. 1. The riser unit 300 includes components with capabilities for monitoring delivery of water to the sprinklers, monitoring water pressure, providing system over-pressure relief, and testing and draining the water sprinkler system. Riser unit 300 incorporates a riser manifold unitary means preferably embodied by the one-piece manifold 301 to assist in making connections to the above-mentioned components as well as water system connections, all as hereinafter described.

Manifold 301 is similar in construction to manifold 151 (see FIG. 1) except as noted below with respect to the ports. Manifold 301 incorporates similar support means (for assisting attachment of the riser manifold unitary means to the structure) embodied by two pedestals 152 for stabilizing of the riser unit 301 by attachment of the riser unit 301 to a convenient location of the residence's structure. The riser unit 300 connects the residence's water piping to the sprinkler system by two connections onto manifold 301 as previously described with respect to FIG. 1 with respect to riser 150. Manifold 301 includes pipe thread attachment locations (on its side facing direction B, as shown in FIG. 9) for system components as illustrated: flow switch means embodied by flow switch 165; test, drain and relief valve means embodied by test, drain and relief valve 304; pressure gauge means embodied by pressure gauge 168.

With particular reference to FIG. 9, the riser unit 300 includes means for conveniently grouping, connecting and securely mounting various components of a fire prevention water sprinkler system; and it embodies herein a riser wherein such multiple ports comprises two such ports in the following order in a direction from such first end of such first longitudinal pipe to such second end of such first longitudinal pipe: a first such port structured and arranged to attach to at least one sprinkler system component having at least a flow-switch capability for monitoring delivery of the water flow to sprinklers of the sprinkler system; a second such port structured and arranged to attach to at least two sprinkler system components each having at least one of the following capabilities: a test-and-drain-valve capability for testing and draining the sprinkler system, a relief-valve capability for providing over-pressure relief for the sprinkler system, a pressure-gauge capability for monitoring water pressure in the sprinkler system. And it further embodies an arrangement wherein such second port is structured and arranged to attach to two sprinkler system components: a first sprinkler system component having a pressure-gauge capability for monitoring water pressure in the sprinkler system; and a second sprinkler system component having a test-and-drain-valve capability for testing and draining the sprinkler system, and a relief-valve capability for providing over-pressure relief for the sprinkler system.

Although water sprinkler systems are custom tailored for each application with a varying quantity of sprinkler heads and a varying layout of interconnecting plumbing, the system component capabilities of riser unit 300 remain reasonably consistent with most applications; and the teachings of the present invention will apply even if in a particular application only two ports are molded into the longitudinal pipe portion of manifold 301 (as embodied and shown in FIG. 9). A pressure gauge 168 indicates the pressure within the system and is monitored for indication that ample pressure is available in the event that the sprinklers will be activated. Over-pressurization of a closed system can occur, from thermal expansion or other reasons.

To functionally connect these components together, manifold 301 is provided. Manifold 301 is a one-piece casting with standard pipe thread connections at inlet 160 (shown in FIG. 1 only), outlet 163, and the drain port of valve 304 and the attached pressure gauge port 305, all as shown. Flow switch port 167 encompasses several embodiments previously described above. The two pedestals 152 for mounting are cast integrally with mounting holes 153 provided. The longitudinal pipe means for guiding water flow from the water supply pipe to the sprinkler system pipe is the same as described for manifold 151 in FIG. 1 and FIG. 2. Preferably, indicia indicating a water flow direction and port identifications are also located similar to riser 150 previously described; however, since riser 300 has only two ports, the indicia are altered to indicate the associated functions attached at the two ports. Preferably those functions are worded "GAUGE", "TEST, DRAIN & RELIEF", and "FLOW". Port identification at flow switch port 167 additionally has adjacent to it arrow 172 (as shown in FIG. 1) indicating direction of water flow within the manifold 301. Additional indicia 173 (shown in FIG. 1) cast into manifold 301 might include trade name and mark, part numbering, patent numbering, manufacturer, and phone number, etc.

A perspective view of manifold 301 is shown in FIG. 9. The manifold 301 is tubular in cross-section and hollow its full length. Extending transversely (perpendicularly) from the longitudinal pipe means of manifold 301 and aligned in parallel relation along a first side B of manifold 301 are port 167 (for attaching flow meter 165 and port 156a (for attaching valve 304), which includes port 305 (for attaching pressure gauge 168) along its length (as shown). Pressure gauge port 305 is attached to test, drain and relief port 156a extending transversely and aligned along an upper side E, approximately centered in the longitudinal pipe of test, drain, and relief valve port 156a. Pressure gauge port 305 preferably has internal pipe threads sized one-quarter inch N.P.T.

It is noted that, although ports for things like test, drain and relief valve ports are usually female and internal, the casting in manifold 301 of male, external threads for such port provides an efficient and direct connection to the usual test, drain and relief valve (i.e., it saves requiring a nipple to be added to the port).

It is preferred that the system components be attached to the pipe thread attachments of the ports of manifold 301 in the following order with respect to a direction from the first end 160a at the pipe threads of inlet 160 (shown in FIG. 1) to the second end 163a at the pipe threads of outlet 163: flow switch means 165; test, drain, and relief valve means 304 (with pressure gauge 168 attached along the port 156a from port 305, as shown). Also preferred in combination, for the reasons herein, are the following dimensions: for the length of manifold 301, about eleven inches; for the location of the center of flow switch port 167 for flow switch 165, about three inches from first end 160a (shown in FIG. 1) of manifold 301; for the location of the center of test and drain port 156a for test, drain and relief valve 304, about eight inches from first end 160a of manifold 301. This arrangement also embodies a riser wherein such second port comprises a second longitudinal pipe extending from and perpendicular to such first longitudinal pipe and wherein such second longitudinal pipe comprises two component attachment structures: a first component attachment structure suitable to assist in attaching a pressure gauge for monitoring water pressure in the sprinkler system; and a second component attachment structure suitable to assist in attaching a valve having at least a test-and-drain-valve capability for testing and draining the sprinkler system.

The above preferred dimensions provide high efficiency in use of space, etc. Considering all of the above and the importance and efficiency (in cost and space) of a minimum length riser while preserving the ability to install the riser manifold for support to either side, the herein illustrated and disclosed arrangement and dimensions are an important part of the present invention, according to a preferred embodiment thereof, and this arrangement embodies herein that said first longitudinal pipe is no more than about eleven inches long.

Another preferred embodiment of the combination test, drain and relief valve 304 is illustrated in FIGS. 10–12. Referring now to FIG. 11, valve 304 is shown in cross-sectional view. As shown, valve 304 comprises a valve body 308 having a fluid inlet 310 and a fluid outlet 311. Disposed within the valve body 308 is a valve seat 313 which is structured and arranged to engage a valve washer 314. The valve washer 314 is preferably attached to valve stem 316 by use of a metal screw 317 which is sized and arranged to engage an internally threaded recess 326 disposed within the bottom end 323 of valve stem 316 (preferably made of brass). The screw 317 is further secured to the valve stem 316 with the use of a screw thread locking product, preferably the product known as "Loctite"(™) (preferably product #271 available from a Loctite Corporation of Newington, Conn.). The valve washer 314 embodies herein a first sealing means for assisting sealing at such valve seat, affixed to such lower portion of such valve stem and structured and arranged for engagement with such valve seat when such valve stem is lowered; and it also embodies herein a first sealer, to assist sealing at such valve seat, affixed to such lower portion of such valve stem and structured and arranged for engagement with such valve seat when such valve stem is lowered. Also shown in FIG. 10 is the use of a lock washer 319, of a type readily selectable by one skilled in such art, preferably used to further secure the screw to the valve stem 316 (190 in FIG. 13).

To accomplish pressure relief capability, valve 304 incorporates the use of a valve stem helical spring 320 which exerts a preset pressure on the valve stem bottom end 323 and the valve washer 314. The valve stem helical spring 320 embodies herein an urging means for urging such valve washer towards such valve seat 313. The predetermined and preset pressure is that pressure which is required to maintain the valve washer 314 against the valve seat 313 during standard fire sprinkler system operating pressure. The "not to exceed" predetermined pressure for fire sprinkler water systems is typically 175 psi. Upon a given fire suppression system exceeding this predetermined pressure, valve washer 314 will be displaced (provided that valve stem 316 is not otherwise blocked from moving) from the valve seat 313 thereby relieving system pressure (by releasing pressurized system fluid through fluid outlet side 311) and thus preventing damage to the system components. When the system pressure has returned to the operating "not to exceed" pressure, spring 320 automatically urges valve washer 314 against valve seat 313 thereby sealing the system from further fluid loss. This arrangement embodies herein an arrangement wherein such first sealing means is removably seated against such valve seat when such control means is in a lowered position whereby such pressure relief capability is provided.

Also shown in FIG. 11 is a valve riser 321, preferably made of a metal material(brass), and having a threaded upper portion 327, and having an internal bore portion 324 therein. Valve riser 321 is preferably integrally cast with and is a part of valve body 308, embodying herein such valve riser comprising an integral element of such valve body. As shown in FIG. 11, bore section 324 has a diameter which is necessary to house spring 320 as shown. The bore section 324 is also sized so as to allow for unobstructed movement of the valve stem 316 therein when the valve is arranged for pressure relief capability. As FIG. 11 further illustrates, the present invention also provides for a (roughly round cylindrical) valve handle 328, preferably rounded and knurled or slotted 332 and preferably made of a metal material. Valve handle 328 (embodying herein such controller comprising an approximately round cylindrical outer surface having indentations structured and arranged to assist a user to grip such controller for turning such controller) comprises a lower portion 329 having a lower internally threaded recess 334, and an upper portion 331 having an upper internally threaded recess 336. Separating each respective recess 334 and 336 is a center portion 338 having an axial hole 340 sized so as to allow unobstructed movement of valve stem 316 upper portion 322 therein when valve 304 is arranged for pressure relief capability. The lower internally threaded recess 334 of valve handle 328 is structured and arranged for adjustable attachment to the threaded upper portion 327 of valve riser 321. Valve handle 328 embodies herein a control means, adjustably attached to such upper end of such valve riser, for implementing raising and lowering of such valve stem; and it also embodies a controller, adjustably attached to such exterior surface of such valve riser, structured and arranged to implement raising and lowering of such valve stem. In operation, opening of valve 304 consists of manipulating the valve handle 328 (preferably by manually turning valve handle 328 counterclockwise) until the valve washer 314 is displaced from the valve seat 313. To facilitate lifting of the valve stem 316, a threaded fastener (preferably a stem bolt 341 as further shown in FIG. 1) is attached, preferably by threaded attachment, to the valve stem upper portion 322 (preferably having a threaded portion). Preferably stem bolt 341 also secures a rubber washer 342 and metal washer 351 to provide further sealing means at the washer handle 328 axial hole 340. Stem bolt 220 embodies herein an engagement means, structured and arranged for attachment adjacent such upper portion of such valve stem, for engaging such control means.

Preferably, a substantially annular tension disk 330, attached by threading means and preferably consisting of a metal material and having a preferred thickness of about ¼ inch is externally threaded (333) and structured and arranged for attachment adjacent the upper internally threaded 334 portion of the valve riser, for use in adjusting the tension on spring 320 so as to more thoroughly ensure that when the system pressure achieves the above mentioned "not-to-exceed" system pressure, the valve washer 314 is displaced from the valve seat 313. As shown in exploded view in FIG. 10, the tension disk 330 is provided with a concentric aperture 344, sized to allow unobstructed movement of valve stem 316 therethrough, and is further provided with substantially cylindrical outer surface threaded portion 333 which is structured and arranged to engage the inner wall threaded portion 334.

Preferably, adjusting the tension in spring 320 consists of engaging the outer surface threaded portion 333 with the inner wall threaded portion 334 and turning (in well known ways) the tension disk 330 so that it recedes into the internal bore portion 324. When so positioned, the planar bottom surface 346 of tension disk 330 is in contact with the top coil 348 of spring 320, as indicated in FIG. 10. Subsequent such turns of the tension disk 330 results in further compression of spring 320 (with a resultant increase in spring tension) resulting in a corresponding increase in the system pressure required to unseat the valve washer 314 from the valve seat 313. The tension disk 330 embodies herein an adjustment means, disposed within such internal bore, for adjusting such urging of such urging means. To avoid accidental or unauthorized adjustment of the tension in spring 320, it is preferred (and often required by applicable safety codes) that spring 320 be factory adjusted prior to installing the valve 304 in the particular fluid system and that the tension disk 330 be secured after adjustment by a suitable thread tightening product, preferably the aforementioned Loctite (™) product. Also, importantly, to prevent fluid from escaping around valve stem 322 when the valve 304 is in an open position, an O-ring-type gasket 350, of the kind readily selectable by one with ordinary skill in such art, is preferably attached to a circumferential groove 352 on valve stem 316, as shown in FIG. 10.

Preferably, in one embodiment the valve 304 may also be structured and arranged to pressure test fire suppression systems as described below. Typically, hydrostatic pressure testing is required in piping systems in order to ascertain the integrity of such systems against leakage and/or faulty components. Commercial fire sprinkler systems typically require a test pressure of approximately 200 psi. Since the test pressure typically exceeds the system pressure which will activate the pressure relief function, this embodiment provides for a blocking pin 354 which is structured and arranged to block movement of the valve stem 316 when the system "not to exceed" pressure is exceeded. This arrangement embodies herein an arrangement wherein such first sealing means is irremovably seated against such valve seat when such valve stem is blocked by such blocking means whereby pressure testing capability is provided. The blocking pin 354 (embodying herein a blocking means, removably affixed in such control means, for implementing blocking of movement of such valve stem away from such valve seat and also embodying herein a such valve-stem-movement blocker, removably affixable in such receiver system of such controller, structured and arranged to implement blocking of movement of such valve stem away from such valve seat) is preferably made of a metal material and is preferably an Allen wrench of the type and size typically used to remove the flow meter cover 164 (shown in FIG. 1). Blocking pin 354 is preferably inserted into pin receiving holes 355 as shown best in FIG. 11, this system embodying herein a blocker system structured and arranged to assist implementation of blocking of movement of such valve stem away from such valve seat. Obtaining pressure test capability is achieved by simply turning valve handle 328 until valve washer 314 is seated against valve seat 313. The blocking pin 354 (embodying herein a blocker element removably affixable in such valve system) is then installed in valve handle 328 by slidably inserting the pin 354 into the pin receiving holes 355 (embodying herein a receiver system structured and arranged to removably receive a valve-stem-movement blocker, and also embodying that such controller is structured and arranged to removably receive such blocker element) passing through each side of valve handle 328. When properly installed, the blocking pin 354 is seated against the valve stem 322 stem bolt top surface 343 as shown in FIG. 11. The blocking pin 354 embodies herein a blocking means, removably attached to such control means, for implementing blocking of movement of such valve stem away from such valve seat. The disclosed use of the instant valve embodies herein the steps of: manipulating such rotary handle until such valve washer is seated against such valve seat; affixing such blocking pin to such rotary handle; manipulating such blocking pin until it contacts such valve stem; pressurizing such fluid system to a pre-determined testing pressure; and manipulating such rotary handle, holding such blocking pin, until such valve washer is displaced from such valve seat, whereby such pressure is relieved in such fluid system.

Upon completion of the pressure test, relieving the fire suppression system of excess pressure consists of simply turning the valve handle 328 until the valve washer 314 is displaced from the valve seat 313 thereby allowing the pressurized fluid to escape through the fluid outlet side 311. The use of the blocking pin 354 has the further advantage of maintaining the stem upper portion 322 disposed within the upper internal threaded recess 336 of valve handle 328 when the user is attempting to alleviate system pressure. This arrangement effectively prevents the sudden movement of the valve stem 316 which may come into contact and injure the hand of the user.

Preferably valve 304 may be arranged for drain/test fluid flow capability which is necessary to either drain the fire suppression system or to check the integrity of the alarm system. As hereinbefore discussed with respect to FIG. 11, opening of valve 304 consists of manipulating the valve handle 328 (preferably by manually turning valve handle 328 counterclockwise). As the threads on the lower internally threaded recess 334 travel along the corresponding threads on the threaded upper portion 327 of valve riser 321, the valve handle 328 rises (defined as the movement of valve handle 328 away from the valve body 308). Continued turning of valve handle 328 causes handle center portion 338 to exert pressure on stem bolt 341 thereby raising the valve stem 316 which, in turn, causes the valve washer 314 to become displaced from the valve seat 313. This arrangement embodies herein an arrangement wherein such first sealing means is displaced from such valve seat when such control means is in a raised position whereby such drain/test fluid flow capability is provided. Closing of valve 304 consists of manipulating the valve handle 328 (preferably by manually turning valve handle 328 clockwise) thereby lowering valve handle 328 (defined as movement of valve handle 328 towards the valve body 308) and thus allowing the tensile force in spring 320 to urge the valve washer 314 against the valve seat 313. A further advantage of the present embodiment is that the valve handle 328 may be operated to open and close the valve 304 even with the blocking pin 354 installed. As hereinbefore discussed, this arrangement is beneficial in preventing injury to the user when the user attempts to alleviate system pressure following a pressure test. Further, the use of threaded portions on the valve riser 321 and valve handle 328 allows for gradual and smooth opening and closing of valve 304. This arrangement is helpful in preventing the "water hammer" effect which is caused when a flow of fluid through a fluid system is suddenly halted thereby creating a reverberating pressure wave in the fluid which may result in system damage.

Installation of valve 304 preferably comprises threaded attachment of valve body 308 to conveniently accessible portion of drain piping 356, preferably comprising threaded pipe, from which the fire suppression fluid is removed from the fire suppression system to either drain the system or check the alarm system integrity. Preferably valve body 308 has an integral 90 degree bend 358 (embodying herein a downward facing faucet opening) for faucet-type outlet 311 drain means thereby eliminating an additional attached elbow fitting 170 (illustrated in FIG. 1).

Referring further to FIG. 10 and FIG. 11, the details of the valve stem 316 of the present embodiment will now be disclosed. The valve stem 316 is preferably made of a metal material and comprises a substantially cylindrical upper stem portion 322 and a substantially cylindrical lower stem portion 323 having a lower stem ledge portion 345 sized to support the lower coil 347 of spring 320. As shown, valve stem 316 is structured so that the upper stem portion 322 has a smaller diameter than the lower stem portion 323. The lower stem portion 323 is provided with a groove 352 structured and arranged to receive a typical O-ring-type gasket 350 (shown in FIG. 11), preferably comprising an essentially rubber material. The valve stem 316 is sized and arranged for concentric placement within the internal bore portion 324 (shown in FIG. 11) such that the lower stem portion 323 is adjacent the lower inner riser portion 349 of valve riser 321. When the valve stem 316 is structured and arranged in the above-mentioned fashion, the O-ring gasket 350 always remains in contact with the lower inner riser portion 349 of valve riser 321 even when the valve washer 314 is fully displaced from the valve seat 313. This arrangement advantageously serves the purpose of effectively insulating the spring from the system fluid, thereby prolonging the life of spring 320. The O-ring gasket 350 embodies herein a second sealing means, attached to such lower portion of such valve stem between such helical spring and such valve seat, for essentially preventing such fluid from contacting such helical spring.

To prevent system fluid from escaping past valve seat 313 when valve 304 is in a closed position, the present embodiment of valve 304 is provided with a lower stem ledge 360 structured and arranged to be integrally attached adjacent the lower valve stem portion 323 of valve stem 316. Lower stem ledge 360 comprises a flat bottom surface, preferably comprising a metal material, having a substantially planar bottom end sized to receive valve washer 314 and washer stiffener 315. The valve washer 314, preferably comprising a rubber-type material, is secured to the flat bottom surface of lower stem ledge 360 with a metal screw fastener 317, preferably comprising a threaded fastener. Also, as shown in FIG. 10, the use of a lock washer 319, of the type readily selectable by one skilled in such art, is preferably used to further secure the screw to the valve stem 316.

Preferably, configuring valve 304 for pressure test capability is achieved by simply turning valve handle 355 until the valve washer 314 is seated against valve seat 313 (such as shown in FIG. 11). The blocking pin 354 is then installed in valve handle 328 by slidably inserting the pin into the pin receiving holes on each side of valve handle 328. When properly installed, the blocking pin 354 is seated against the valve stem 322 stem bolt top surface 343 as shown in FIG. 11.

Figure 14:
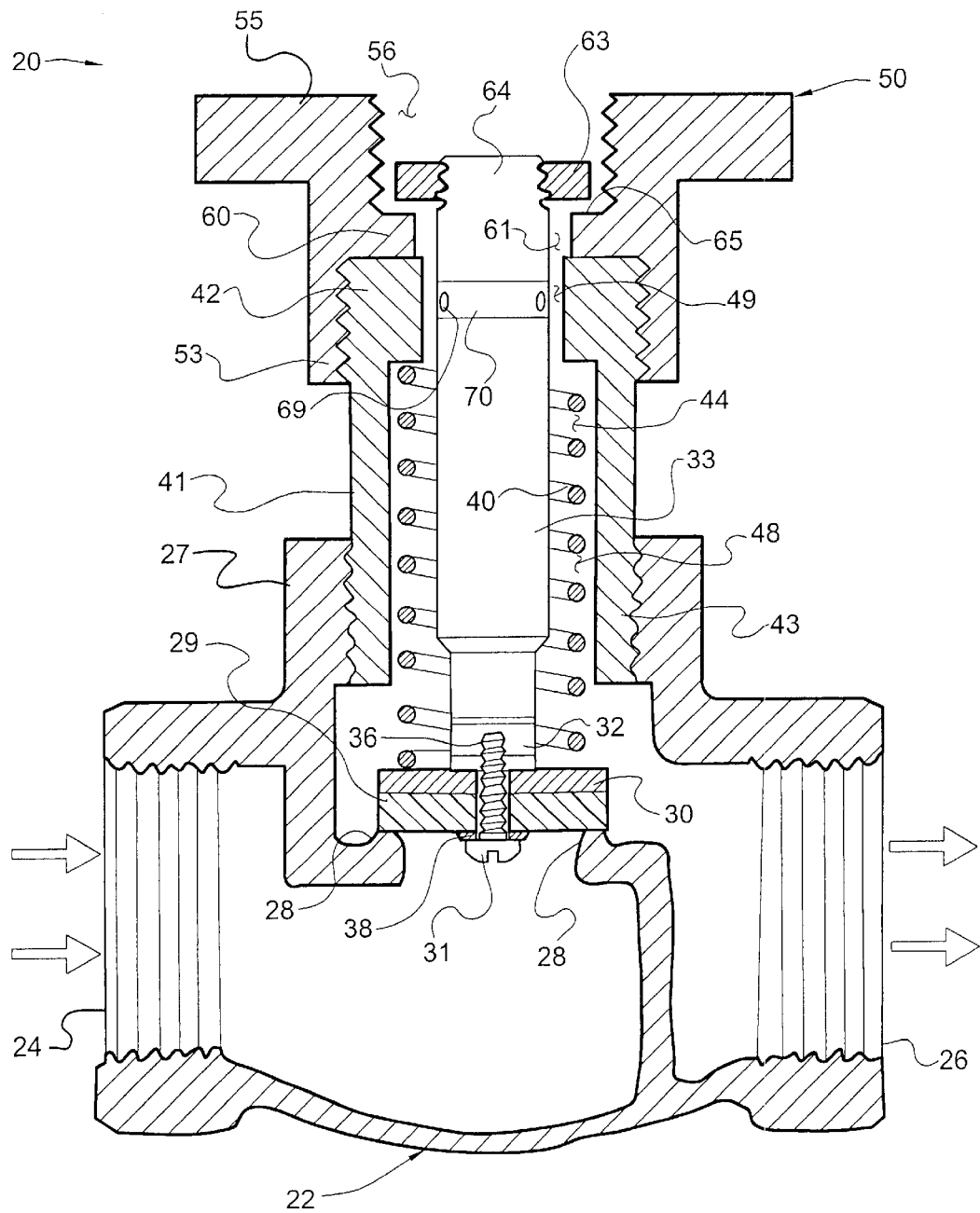
FIG. 14 is a cross-sectional view of another preferred embodiment of the valve system of the present invention in pressure relief mode.

Another preferred embodiment of the valve system of the present invention, herein referred to as valve 20, is shown in cross-sectional view in FIG. 14. Referring to FIG. 14, valve 20 consists of a standard globe valve body 22 (well-known to those skilled in the art) of a predetermined size (readily selectable by those skilled in the art) and having a fluid inlet side 24, a fluid outlet side 26 and having an internally threaded upper portion 27. Disposed within the valve body 22 is a valve seat 28 which is structured and arranged to engage a valve washer 29. To provide lateral support to valve washer 29, a washer support 30, preferably made of a metal material, is attached, preferably adhesively, to valve washer 29. The washer support 30 and valve washer 29 combination are preferably attached by use of a metal screw 31 which is sized and arranged to engage an internally threaded recess 36 disposed within the bottom end 32 of valve stem 33 (preferably made of stainless steel). The valve washer 29 embodies herein a first sealing means for assisting sealing at such valve seat, affixed to such lower portion of such valve stem and structured and arranged for engagement with such valve seat when such valve stem is lowered.

Also shown in FIG. 14 is the use of a lock washer 38, of the type readily selectable by one skilled in such art, used to further secure the valve washer 29 and washer support 30 to the valve stem 33. The screw 31 is further secured to the valve stem 33 with the use of a screw thread locking product, preferably the product known as "Loctite"(™) (preferably product #271 available from a Loctite Corporation of Newington, Conn.). To accomplish pressure relief capability, valve 20 incorporates the use of a valve stem helical spring 40 which exerts a predetermined pressure on the washer support 30 and valve washer 29 combination. The valve stem helical spring 40 embodies herein an urging means for urging such valve washer towards such valve seat. The predetermined pressure is that pressure which is required to maintain the valve washer 29 against the valve seat 28 during standard fire sprinkler system operating pressure. The "not to exceed" predetermined pressure for fire sprinkler water systems is typically 175 psi. Upon a given fire suppression system exceeding this predetermined pressure, valve washer 29 will be displaced (provided that valve stem 33 is not otherwise blocked from moving) from the valve seat 28 thereby relieving system pressure (by releasing pressurized system fluid through fluid outlet side 26) and thus preventing damage to the system components. When the system pressure has returned to the operating "not to exceed" pressure, spring 40 automatically urges valve washer 29 against valve seat 28 thereby sealing the system from further fluid loss. This arrangement embodies herein an arrangement wherein such first sealing means is removably seated against such valve seat when such control means is in a lowered position whereby such pressure relief capability is provided.

Figure 16:
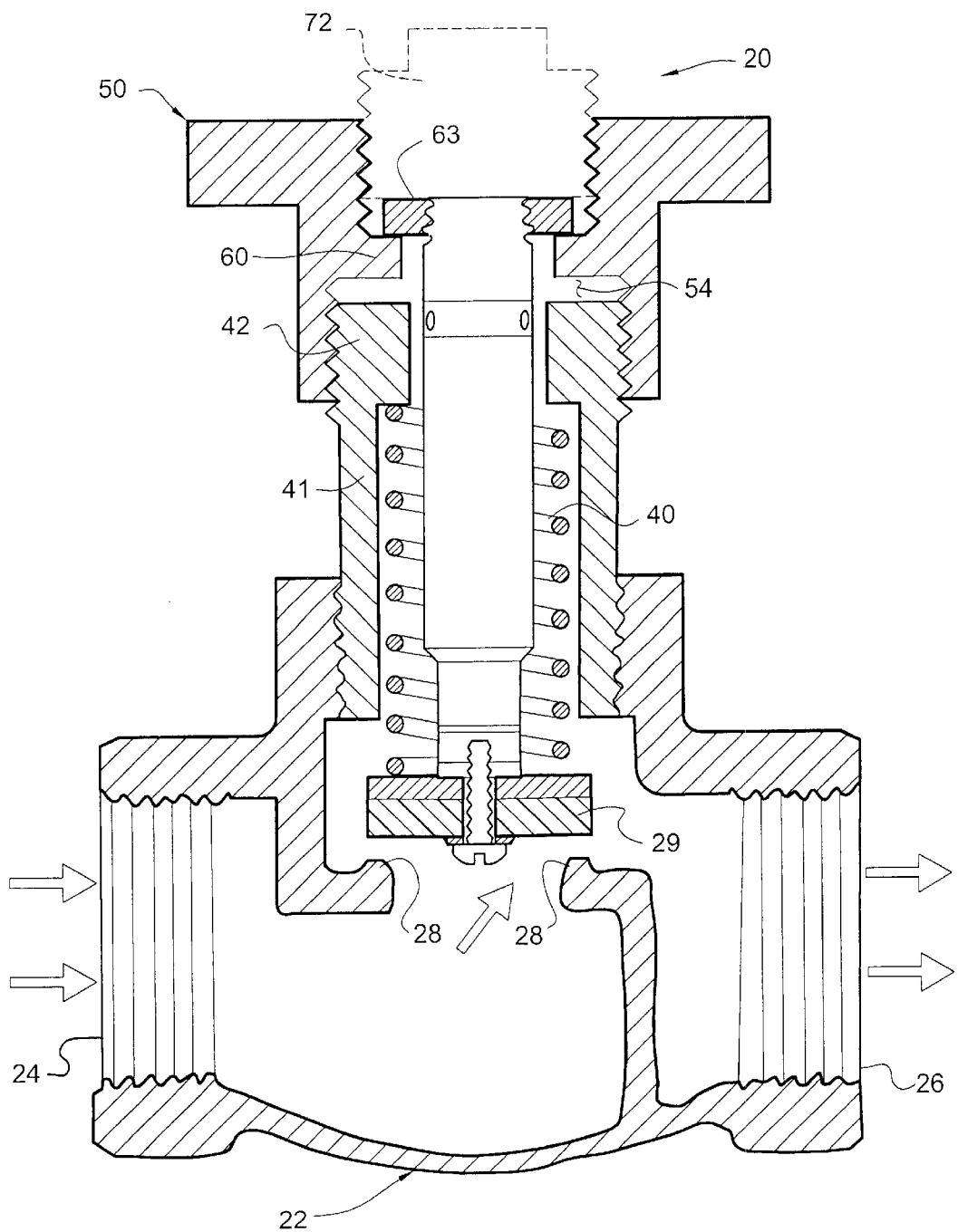
FIG. 16 is a cross-sectional view of the of the preferred embodiment of the valve system of FIG. 14 with valve open for flow test mode.

Also shown in FIG. 14 is a valve riser 41, preferably made of a metal material, and having a threaded upper portion 42, a threaded lower portion 43, and having an internal bore portion 44 therein. The threaded lower portion 43 of valve riser 41 is sized to frictionally engage the internally threaded upper portion 27 of valve body 22. To assist in maintaining a tight connection between valve riser 41 and valve body 22, a thread tightening product, preferably "Loctite"(™) may be applied to the threaded lower portion 43 of valve riser 41 and the internally threaded upper portion 27 of valve body 22. Internal bore portion 44 comprises a first bore section 48 and a second bore section 49. As shown in FIG. 14, first bore section 48 has a diameter greater than the second bore section 49 which is necessary to house spring 40 as shown. The second bore section 49 is sized so as to allow for unobstructed movement of the valve stem 33 therein when the valve is arranged for pressure relief capability as shown in FIG. 14. As FIG. 14 further illustrates, the present invention also provides for a valve handle 50, preferably of the rotary type and preferably made of a metal material. Valve handle 50 comprises a lower portion 53 having a lower internally threaded recess 54 (as shown best in FIG. 16), and an upper portion 55 having an upper internally threaded recess 56. Separating each respective recess 54 and 56 is a center portion 60 having an axial hole 61 sized so as to allow unobstructed movement of valve stem 33 therein when valve 20 is arranged for pressure relief capability. The lower internally threaded recess 54 of valve handle 50 is structured and arranged for adjustable attachment to the threaded upper portion 42 of valve riser 41. Valve handle 50 embodies herein a control means, adjustably attached to such upper end of such valve riser, for implementing raising and lowering of such valve stem. In operation, opening of valve 20 consists of manipulating the valve handle 50 (preferably by manually turning valve handle 50 counterclockwise) until the valve washer 29 is displaced from the valve seat 28 (as shown in FIG. 16). To facilitate lifting of the valve stem 33, a threaded fastener (preferably a stem nut 63 as shown) is attached, preferably by threaded attachment, to the valve stem upper portion 64 (preferably having a threaded portion). Stem nut 63 embodies herein an engagement means, structured and arranged for attachment adjacent such upper portion of such valve stem, for engaging such control means. As valve handle 50 is turned, the center portion upper surface 65 engages the stem nut 63 thereby raising the valve stem 33. To prevent fluid from escaping around valve stem 33 when the valve 20 is in an open position, an O-ring-type gasket 69, of the kind readily selectable by one with ordinary skill in such art, is attached to a circumferential groove 70 on valve stem 33, as shown.

Figure 15:
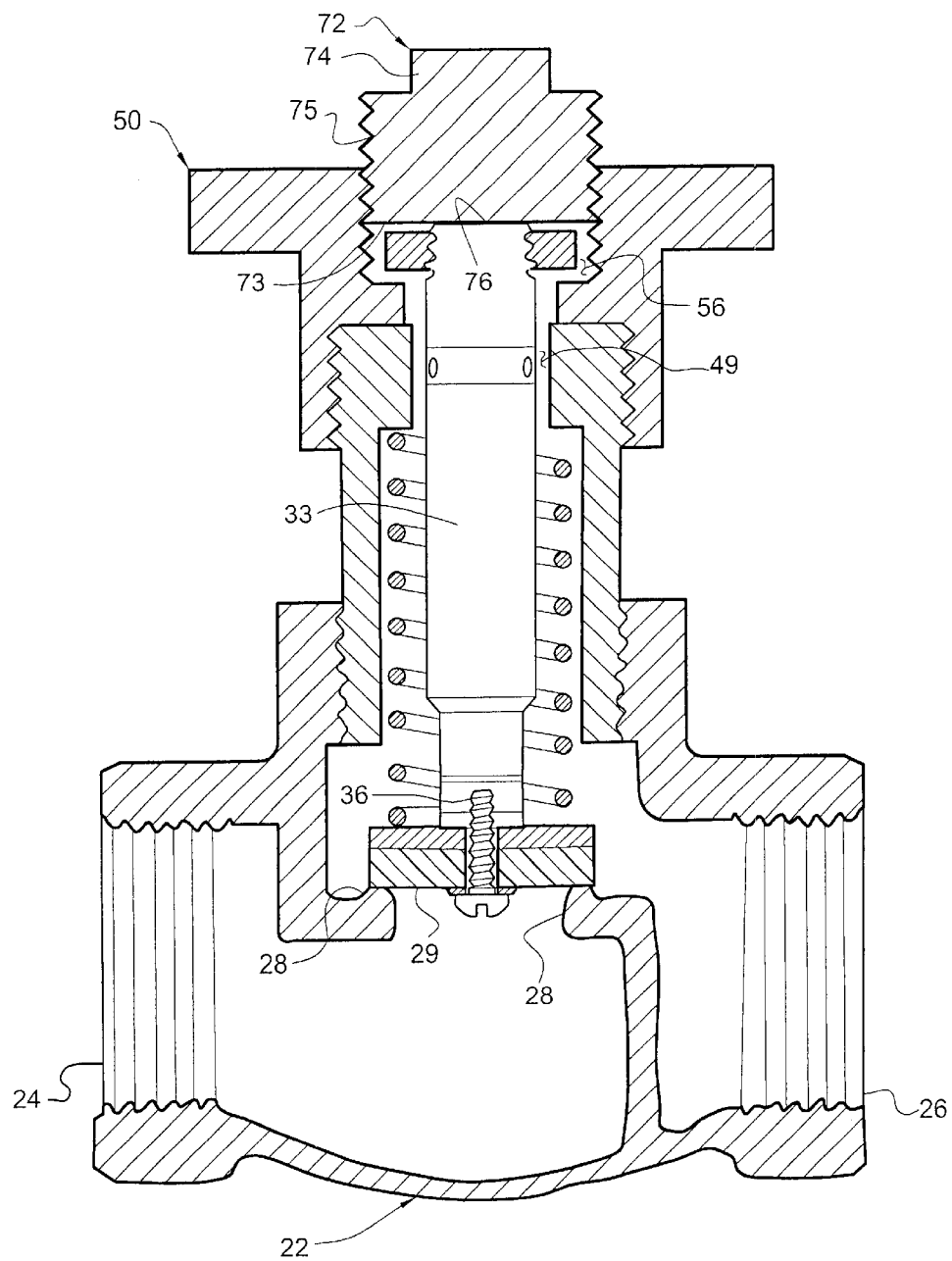
FIG. 15 is a cross-sectional view of the preferred embodiment of the valve system of FIG. 14 with blocking plug installed for pressure test mode.

The valve 20 of the present invention may also be structured and arranged to pressure test fire suppression systems as shown in FIG. 15. Typically, hydrostatic pressure testing is required in piping systems in order to ascertain the integrity of such systems against leakage and/or faulty components. Commercial fire sprinkler systems typically require a test pressure of approximately 200 psi. Since the test pressure typically exceeds the system pressure which will activate the pressure relief function, the present invention provides for a blocking plug 72 which is structured and arranged to block movement of the valve stem 33 when the system "not to exceed" pressure is exceeded. This arrangement embodies herein an arrangement wherein such first sealing means is irremovably seated against such valve seat when such valve stem is blocked by such blocking means whereby pressure testing capability is provided. The blocking plug 72 is preferably made of a metal material and has a bottom surface 73, a plug upper portion 74 and a cylindrical externally threaded plug lower portion 75. Obtaining pressure test capability is achieved by simply turning valve handle 50 until valve washer 29 is seated against valve seat 28. The blocking plug 72 is then installed in valve handle 50 by attaching, preferably by a threaded attachment, the externally threaded plug lower portion 75 to the upper internally threaded recess 56 of valve handle 50. When properly installed, the bottom surface 73 of blocking plug 72 is seated against the valve stem top surface 76 as shown in FIG. 15. The blocking plug 72 embodies herein a blocking means, removably attached to such control means, for implementing blocking of movement of such valve stem away from such valve seat. The disclosed use of the instant valve embodies herein the steps of: manipulating such rotary handle until such valve washer is seated against such valve seat; affixing such blocking plug to such rotary handle; manipulating such blocking plug until it contacts such valve stem; pressurizing such fluid system to a pre-determined testing pressure; and manipulating such rotary handle, holding such blocking plug, until such valve washer is displaced from such valve seat, whereby such pressure is relieved in such fluid system.

To facilitate installation of blocking plug 72, the plug upper portion 74 has, for example, as shown, a square circumference sized to fit a typical box-end wrench (not shown), although a circular circumference with a means to engage a flat edge (such as a screwdriver head) may be used without deviating from the spirit of the present invention. Upon completion of the pressure test, relieving the fire suppression system of excess pressure consists of simply turning the valve handle 50 until the valve washer 29 is displaced from the valve seat 28 (as shown in FIG. 16) thereby allowing the pressurized fluid to escape through the fluid outlet side 26. The use of the blocking plug 72 has the further advantage of maintaining the stem upper portion 64 disposed within the upper internal threaded recess 56 of valve handle 50 when the user is attempting to alleviate system pressure. This arrangement effectively prevents the sudden movement of the valve stem 33 which may come into contact and injure the hand of the user.

Shown in cross-section in FIG. 16 is the valve 20 of the present invention arranged for drain/test fluid flow capability which is necessary to either drain the fire suppression system or to check the integrity of the alarm system. As hereinbefore discussed with respect to FIG. 14, opening of valve 20 consists of manipulating the valve handle 50 (preferably by manually turning valve handle 50 counterclockwise). As the threads on the lower internally threaded recess 54 travel along the corresponding threads on the threaded upper portion 42 of valve riser 41, the valve handle 50 rises (defined as the movement of valve handle 50 away from the valve body 22). Continued turning of valve handle 50 causes handle center portion 60 to exert pressure on stem nut 63 thereby raising the valve stem 33 which, in turn, causes the valve washer 29 to become displaced from the valve seat 28. This arrangement embodies herein an arrangement wherein such first sealing means is displaced from such valve seat when such control means is in a raised position whereby such drain/test fluid flow capability is provided. Closing of valve 20 consists of manipulating the handle 50 (preferably by manually turning valve handle 50 clockwise) thereby lowering handle 50 (defined as movement of valve handle 50 towards the valve body 22) and thus allowing the tensile force in spring 40 to urge the valve washer 29 against the valve seat 28. A further advantage of the present invention is that the valve handle 50 may be operated to open and close the valve 20 even with the blocking plug 72 (as shown in alternate detail) installed. As hereinbefore discussed, this arrangement is beneficial in preventing injury to the user when the user attempts to alleviate system pressure following a pressure test. Further, the use of threaded portions on the valve riser 41 and valve handle 50 allows for gradual and smooth opening and closing of valve 20. This arrangement is helpful in preventing the "water hammer" effect which is caused when a flow of fluid through a fluid system is suddenly halted thereby creating a reverberating pressure wave in the fluid which may result in system damage.

Figure 17:
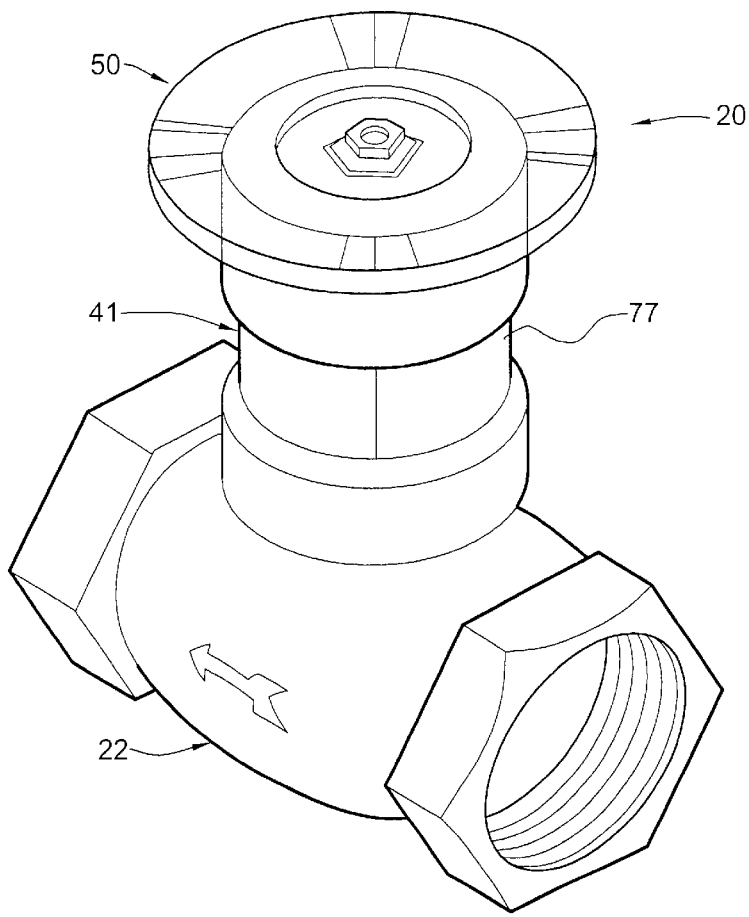
FIG. 17 is a perspective view of the of the preferred embodiment of the valve system of FIG. 14 of the present invention.
Figure 18:
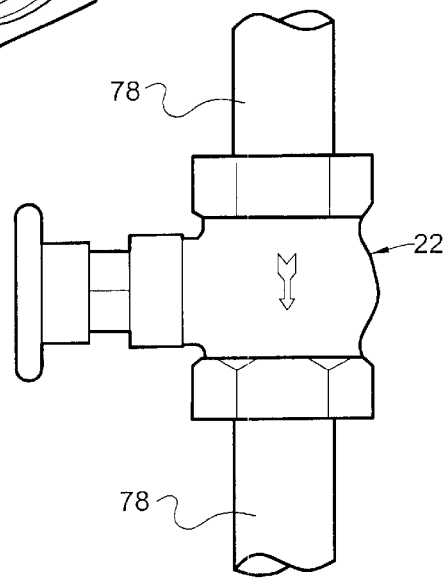
FIG. 18 is a side view of the of the preferred embodiment of the valve system of FIG. 14 of the present invention installed in-line in a pressurized water fire sprinkler system.

Shown in FIGS. 17 and 18 is the valve 20 in perspective and in elevation respectively. As specifically illustrated in FIG. 17, the valve riser 41 preferably comprises a substantially square riser center portion 77 that is sized to receive a typical box-end wrench. Shown in FIG. 18 is the valve 20 installed at the base of a typical gridded fire suppression system. Installation of valve 20 preferably comprises threaded attachment of valve body 22 to conveniently accessible portion of the drain piping 78, preferably comprising threaded pipe, from which the fire suppression fluid is removed from the fire suppression system to either drain the system or check the alarm system integrity.

Figure 19:
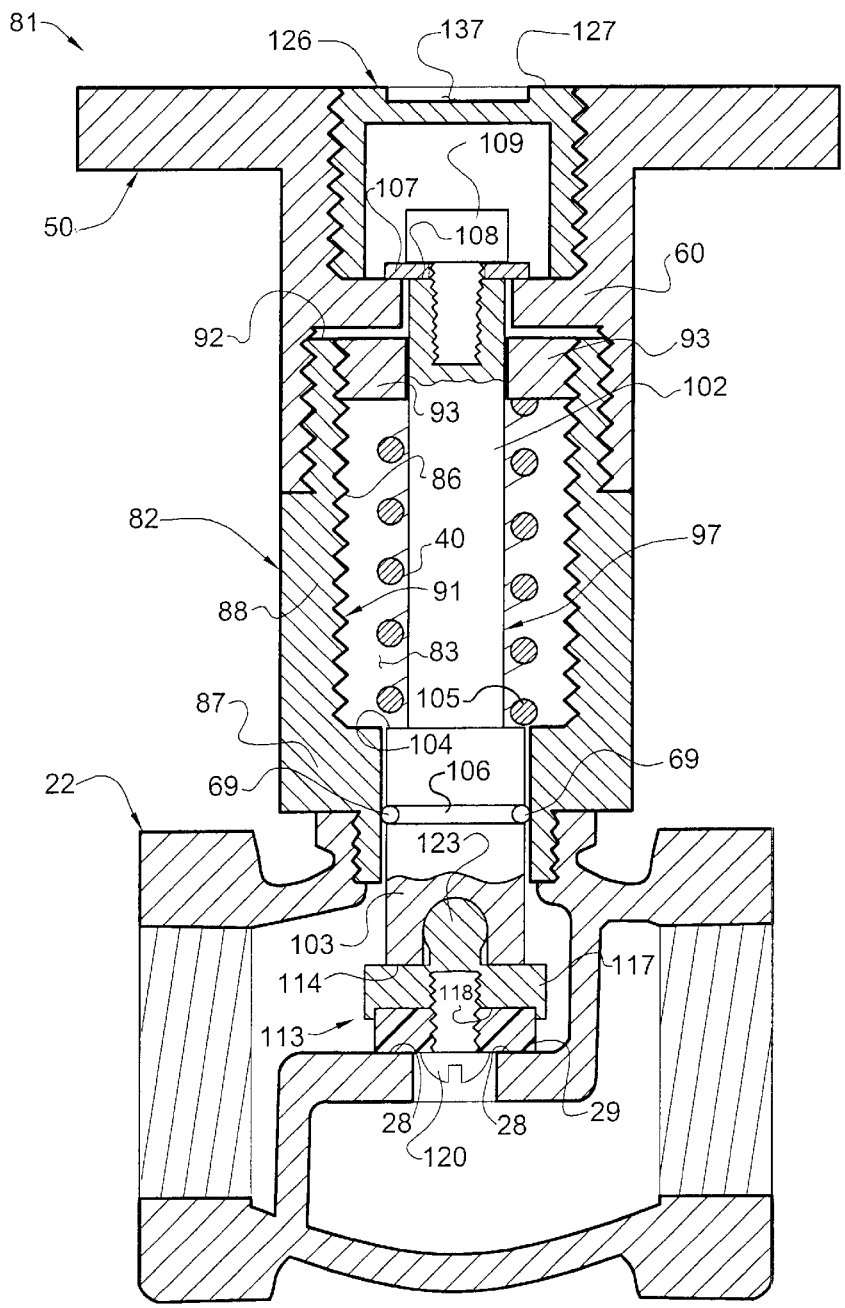
FIG. 19 is a partial cross-sectional view of yet another alternate preferred embodiment of the valve system.

With reference now to FIGS. 19–23, yet another alternate preferred embodiment of the valve, hereinafter designated by reference numeral 81, is described; valve 81 is similar in structure and operation to valve 180 (see FIGS. 12–13), previously described. The valve 81 is structured and arranged to substantially provide the same aforementioned functions as valve 20; and valve 81 is further provided with a variety of added beneficial features which will now be fully disclosed. As described with reference to similar valve 180, the valve 81 is provided with a valve body 22 and valve handle 50, both as substantially illustrated and described previously with respect to FIGS. 14–18. The alternate preferred embodiment of the present invention is also provided with a valve riser 82, preferably made of a metal material, and having an internal bore portion 83 defined by the riser inner wall 86. The valve riser 82 is attached to both the valve handle 50 and valve body 22 in accordance with the attachment method fully disclosed with respect to FIG. 14. For reasons which will become apparent as this present disclosure progresses, the valve riser 82 comprises a lower inner riser portion 87 having a smaller internal diameter than the upper inner riser portion 88 which is sized to house spring 40. As shown in FIG. 19, the upper inner riser portion 88 comprises an inner wall threaded portion 91 originating from the riser top end 92 and preferably terminating at the lower inner riser portion 87, as shown.

Figure 21:
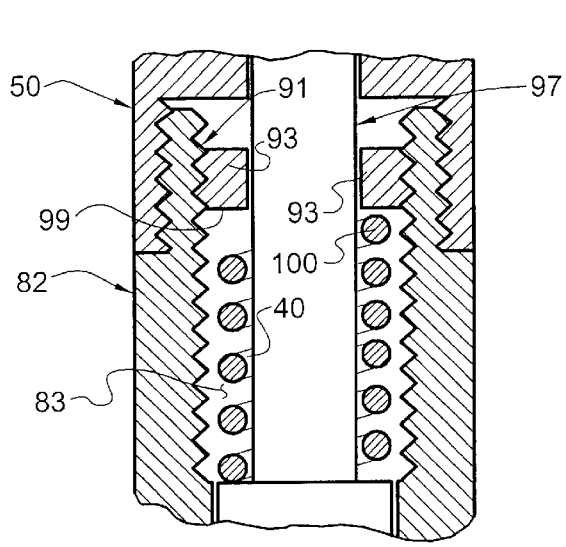
FIG. 21 is a partial cross-sectional view of the alternate preferred valve system of FIG. 19 showing the location of the tension disk.
Figure 20:
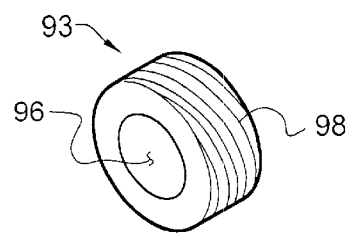
FIG. 20 is a perspective view of the tension disk for use in the alternate preferred embodiment of FIG. 19.
Figure 22:
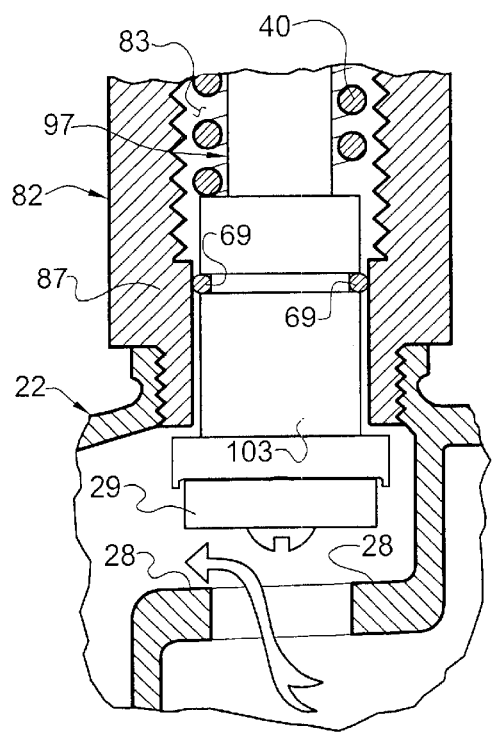
FIG. 22 is a partial cross sectional view of the valve system of FIG. 19 showing a preferred valve stem arrangement.

Also shown in FIG. 19 is a substantially annular tension disk 93, preferably consisting of a metal material and having a preferred thickness of about ¼ inch, for use in adjusting the tension on spring 40 so as to more thoroughly ensure that when the system pressure achieves the above mentioned "not-to-exceed" system pressure, the valve washer 29 is displaced from the valve seat 28. As shown in perspective in FIG. 20, the tension disk 93 is provided with a concentric aperture 96, sized to allow unobstructed movement of valve stem 97 therethrough, and is further provided with substantially cylindrical outer surface threaded portion 98 which is structured and arranged to engage the inner wall threaded portion 91. Referring now to FIG. 21, adjusting the tension in spring 40 consists of engaging the outer surface threaded portion 98 with the inner wall threaded portion 91 and turning (in well known ways) the tension disk 93 so that it recedes into the internal bore portion 83. When so positioned, the planar bottom surface 99 of tension disk 93 is in contact with the top coil 100 of spring 40, as shown. Subsequent such turns of the tension disk 93 results in further compression of spring 40 (with a resultant increase in spring tension) resulting in a corresponding increase in the system pressure required to unseat the valve washer 29 from the valve seat 28. The tension disk 93 embodies herein an adjustment means, disposed within such internal bore, for adjusting such urging of such urging means. To avoid accidental or unauthorized adjustment of the tension in spring 40, it is preferred (and often required by applicable safety codes) that spring 40 be factory adjusted prior to installing the valve 81 in the particular fluid system and that the tension disk 93 be secured after adjustment by a suitable thread tightening product, preferably the aforementioned Loctite (™) product.

Figure 23:
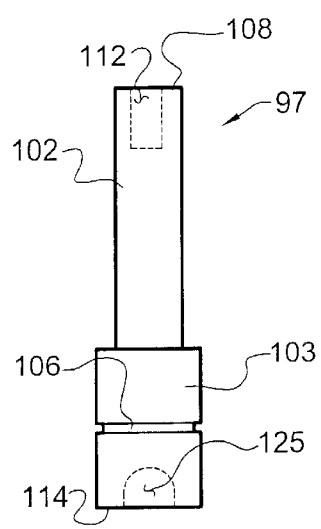
FIG. 23 is an elevation view showing the details of the preferred valve stem arrangement for use with the valve system of FIG. 19.

Referring further to FIG. 19 and introducing FIG. 23, the details of the valve stem 97 of the present embodiment will now be disclosed. The valve stem 97 is preferably made of a metal material and comprises a substantially cylindrical upper stem portion 102 and a substantially cylindrical lower stem portion 103 having a lower stem ledge portion 104 sized to support the lower coil 105 of spring 40. As shown, valve stem 97 is structured so that the upper stem portion 102 has a smaller diameter than the lower stem portion 103. The lower stem portion 103 is provided with a groove 106 structured and arranged to receive a typical O-ring-type gasket 69, preferably comprising an essentially rubber material. The valve stem 97 is sized and arranged for concentric placement within the internal bore portion 83 such that the lower stem portion 103 is adjacent the lower inner riser portion 87 of valve riser 82. As shown in partial cross section in FIG. 22, when the valve stem 97 is structured and arranged in the above-mentioned fashion, the gasket 69 always remains in contact with the lower inner riser portion 87 of valve riser 82 even when the valve washer 29 is fully displaced from the valve seat 28. This arrangement advantageously serves the purpose of effectively insulating the spring 40 from the system fluid, thereby prolonging the life of spring 40. The gasket 69 embodies herein a second sealing means, attached to such lower portion of such valve stem between such helical spring and such valve seat, for essentially preventing such fluid from contacting such helical spring.

To provide a means to manually raise valve stem 97, the valve 81 is provided with an annular washer 107, of a type well known in such art, which is structured and arranged to engage handle center portion 60 when the valve 81 is manually opened in accordance with the aforementioned disclosure accompanying FIG. 16. As shown in FIG. 19, the annular washer 107 is secured to the top surface 108 of valve stem 97 by use of a fastener 109, preferably a threaded fastener, which is structured and arranged for receipt by the stem upper threaded recess 112 (as shown best in FIG. 23). The annular washer 107 embodies herein an engagement means, structured and arranged for attachment adjacent such upper portion of such valve stem, for engaging such control means. To prevent system fluid from escaping past seat 28 when valve 81 is in a closed position, the present embodiment of valve 81 is provided with a foot assembly 113 structured and arranged for attachment adjacent the bottom surface 114 of valve stem 97. The foot assembly 113 comprises a foot 117, preferably comprising a metal material, having a substantially planar first end 118 sized to receive valve washer 29. The valve washer 29, preferably comprising a rubber-type material, is secured to the foot 117 with a fastener 120, preferably comprising a threaded fastener. The foot 117 is also provided with a ball portion 123 structured and arranged to engage a valve stem socket 125 (shown best in FIG. 23). Both the ball portion 123 and corresponding valve stem socket 125 are sized to provide a typical ball-and-socket connection in which the foot assembly 113 is prevented from being displaced from the valve stem 97 while still being allowed sufficient movement, relative to valve stem 97, so as to fully seat the valve washer 29 against valve seat 28.

Figure 24:
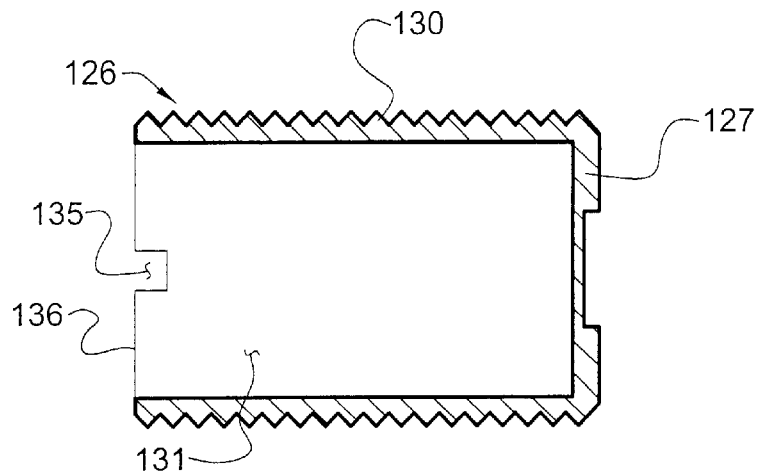
FIG. 24 is a cross sectional view of an alternate preferred embodiment of a blocking plug.
Figure 25:
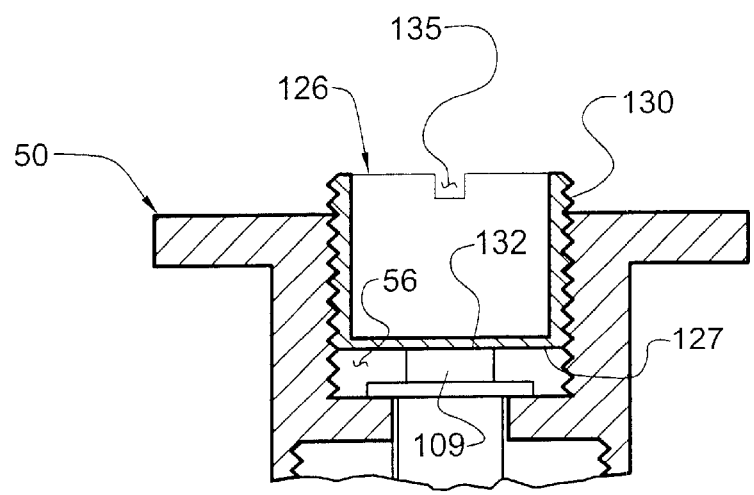
FIG. 25 is a partial cross sectional view showing the arrangement of the blocking plug of FIG. 24 on the valve system so as to provide pressure test capability.

Also shown in FIG. 19 is an alternate preferred embodiment of blocking plug, hereinafter referred to as blocking plug 126, arranged in a stow-away position on valve handle 50 so as to not interfere with the pressure relief capability of valve 81. Referring now to FIG. 24, the blocking plug 126 is preferably made of a metal material and has a planar surface 127, a substantially cylindrical externally threaded body 130, and an internal chamber portion 131. With reference now to FIG. 25, configuring valve 81 for pressure test capability is achieved by simply turning valve handle 50 until the valve washer 29 is seated against valve seat 28 (such as shown in FIG. 19). The blocking plug 126 is then installed in valve handle 50 by attaching, preferably by a threaded attachment, the externally threaded body 130 to the upper internally threaded recess 56 of valve handle 50. When properly installed, the planar surface 127 of blocking plug 126 is seated against the head top surface 132 of fastener 109. To facilitate attachment of the blocking plug 126 in the aforementioned manner, notches 135 are provided in the lip portion 136 which are structured and arranged to receive the flat edge of a screwdriver or like device. To facilitate attachment of the blocking plug 126 into valve handle 50 in the manner shown in FIG. 19, the planar surface 127 is also provided with a channel 137 for receiving the flat edge of a screwdriver or like device.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. A multi-function unitary valve system for use in a fluid system containing a fluid and having pressure testing, pressure relief, and drain/test free fluid flow capability, comprising, in combination:
  a) a valve body having an inlet portion an outlet portion, and a valve seat;
  b) a valve riser affixed to said valve body and having an exterior surface and an internal bore;
  c) a valve stem concentrically disposed within said valve riser and having an upper portion and a lower portion;
  d) a first sealer, to assist sealing at said valve seat, affixed to said lower portion of said valve stem and structured and arranged for engagement with said valve seat when said valve stem is lowered;
  e) a controller, adjustably attached to said exterior surface of said valve riser, structured and arranged to implement raising and lowering of said valve stem;
  f) an engaging element, structured and arranged to attach to said valve stem adjacent said upper portion of said valve stem and to engage said controller; and
  g) an urger structured and arranged to urge said first sealer towards said valve seat.

2. A multi-function unitary valve system according to claim 1 wherein said controller comprises:
  a) a receiver system structured and arranged to removably receive a valve-stem-movement blocker.

3. A multi-function unitary valve system according to claim 2 further comprising:
  a) a valve-stem-movement blocker, removably affixable in said receiver system of said controller, structured and arranged to implement blocking of movement of said valve stem away from said valve seat blocker.

4. A multi-function unitary valve system according to claim 1 wherein said outlet portion of said valve body comprises a downward facing faucet opening.

5. A multi-function unitary valve system according to claim 1 wherein said valve riser comprises an integral element of said valve body.

6. A multi-function unitary valve system according to claim 5 wherein said outlet portion of said valve body comprises a downward facing faucet opening.

7. A multi-function unitary valve system according to claim 6 wherein said controller comprises an approximately round cylindrical outer surface having indentations structured and arranged to assist a user to grip said controller for turning said controller.

8. A multi-function unitary valve system according to claim 1 further comprising an adjuster, disposed within said internal bore, structured and arranged to adjust said urger.

9. A multi-function unitary valve system for use in a fluid system containing a fluid and having pressure testing, pressure relief, and drain/test free fluid flow capability, comprising, in combination:
- a) a valve body having an inlet portion, an outlet portion, and a valve seat;
- b) a valve riser affixed to said valve body and having an upper end and having an internal bore;
- c) a valve stem concentrically disposed within said valve riser and having an upper portion and a lower portion;
- d) a first sealing means for assisting sealing at said valve seat, affixed to said lower portion of said valve stem and structured and arranged for engagement with said valve seat when said valve stem is lowered;
- e) a control means, adjustably attached to said upper end of said valve riser, for implementing raising and lowering of said valve stem;
- f) an engagement means, structured and arranged for attachment adjacent said upper portion of said valve stem, for engaging said control means;
- g) an urging means for urging said first sealing means towards said valve seat; and
- h) a blocking means, removably affixed in said control means, for implementing blocking of movement of said valve stem away from said valve seat.

10. A multi-function unitary valve system according to claim 9 wherein said control means comprises a handle having a threaded recessed upper portion.

11. A multi-function unitary valve system according to claim 10 wherein said blocking means comprises a blocking plug having an externally threaded substantially cylindrical portion structured and arranged for engagement with said threaded recessed upper portion of said handle.

12. A multi-function unitary valve system according to claim 9 wherein said first sealing means is displaced from said valve seat when said control means is in a raised position, whereby said drain/test free fluid flow capability is provided.

13. A multi-function unitary valve system according to claim 9 wherein said first sealing means is removably seated against said valve seat when said control means is in a lowered position, whereby said pressure relief capability is provided.

14. A multi-function unitary valve system according to claim 9 wherein said first sealing means is irremovably seated against said valve seat when said valve stem is blocked by said blocking means, whereby pressure testing capability is provided.

15. A multi-function unitary valve system according to claim 9 wherein said engagement means comprises a threaded fastener.

16. A multi-function unitary valve system according to claim 15 wherein said upper portion of said valve stem comprises a threaded portion structured and arranged for engagement with said threaded fastener.

17. A multi-function unitary valve system according to claim 9 wherein said upper end of said valve riser comprises an upper riser threaded portion.

18. A multi-function unitary valve system according to claim 17 wherein said handle further comprises a substantially cylindrical lower end having a threaded interior recess structured and arranged to engage said upper riser threaded portion.

19. A multi-function unitary valve system according to claim 9 wherein said urging means comprises a helical spring structured and arranged for location adjacent said upper portion of said valve stem.

20. A multi-function unitary valve system according to claim 9 wherein:
- a) said first sealing means is displaced from said valve seat when said control means is in a raised position, whereby said drain/test free fluid flow is provided;
- b) said first sealing means is removably seated against said valve seat when said control means is in a lowered position, whereby said pressure relief capability is provided; and
- c) said first sealing means is irremovably seated against said valve seat when said valve stem is blocked by said blocking means and when said control means is in a lowered position, whereby pressure testing capability is provided.

21. A multi-function unitary valve system according to claim 9 wherein:
- a) said engagement means comprises an annular washer; and
- b) said first sealing means comprises a valve washer.

22. A multi-function unitary valve system according to claim 19 further comprising a second sealing means, attached to said lower portion of said valve stem between said helical spring and said valve seat, for essentially preventing said fluid from contacting said helical spring.

23. A multi-function unitary valve system according to claim 22 wherein said second sealing means comprises an essentially rubber material.

24. A multi-function unitary valve system according to claim 9 further comprising an adjustment means, disposed within said internal bore, for adjusting said urging of said urging means.

25. A multi-function unitary valve system according to claim 9 further comprising:
- a) a second sealing means, attached to said lower portion of said valve stem, for essentially preventing said fluid from contacting said urging means; and
- b) an adjustment means, disposed within said internal bore, for adjusting said urging of said urging means.

26. A multi-function unitary valve system for use in a fluid system containing a fluid and having pressure testing, pressure relief, and test/drain free fluid flow capability, comprising, in combination:
- a) a valve body having an inlet portion, an outlet portion, and a valve seat;
- b) a valve riser, affixed to said valve body, having an upper riser threaded portion and having an internal bore defined by a riser inner wall;
- c) a valve stem concentrically disposed within said valve riser and having an upper portion and a lower portion;
- d) a first sealing means for assisting sealing at said valve seat, affixed to said lower portion of said valve stem and structured and arranged for engagement with said valve seat when said valve stem is lowered;
- e) a handle having a threaded recessed upper portion and a substantially cylindrical lower portion having a threaded internal recess structured and arranged for releasable attachment with said upper riser threaded portion;
- f) a blocking plug having an externally threaded substantially cylindrical lower portion structured and arranged for engagement with said threaded recessed upper portion of said handle;
- g) an engagement means, structured and arranged for attachment adjacent said upper portion of said valve stem, for engaging said control means;
- h) a helical spring, disposed within said valve riser, for urging said first sealing means against said valve seat.

27. A multi-function unitary valve system according to claim 26 wherein said riser inner wall comprises a threaded portion.

28. A multi-function unitary valve system according to claim 27 further comprising a tension disk, said tension disk comprising:
   a) a substantially cylindrical outer surface comprising external threads structured and arranged to engage said threaded portion of said riser inner wall;
   b) a concentric aperture structured and arranged to allow unobstructed movement of said valve stem through said concentric aperture; and
   c) a bottom disk surface structured and arranged for engagement with a top coil of said helical spring.

29. A multi-function unitary valve system according to claim 26 further comprising a gasket, attached to said lower portion of said valve stem, structured and arranged for slidable engagement with said riser inner wall, whereby said fluid is essentially prevented from contacting said helical spring.

30. A multi-function unitary valve system according to claim 28 further comprising a gasket, attached to said lower portion of said valve stem, sized and arranged for slidable engagement with said riser inner wall, whereby said fluid is essentially prevented from contacting said helical spring.

31. A multi-function unitary valve system according to claim 26 wherein said handle is structured and arranged to displace said first sealing means from said valve seat when said handle is in a raised position whereby said test/drain free fluid flow capability is provided.

32. A multi-function unitary valve system according to claim 26 wherein said handle is structured and arranged to removably seat said first sealing means against said valve seat when said handle is in a lowered position whereby said pressure relief capability is provided.

33. A multi-function unitary valve system according to claim 26 wherein said handle is structured and arranged to irremovably seat said first sealing means against said valve seat when:
   a) said handle is in a lowered position and
   b) said blocking plug is affixed to said handle,
   c) whereby said pressure test-capability is provided.

34. A multi-function unitary valve system according to claim 26 wherein:
   a) said engagement means comprises a threaded fastener;
   b) said upper portion of said valve stem comprises a threaded portion structured and arranged for engagement with said threaded fastener; and
   c) said first sealing means comprises a valve washer.

35. A multi-function unitary valve system according to claim 26 wherein:
   a) said engagement means comprises an annular washer; and
   b) said first sealing means comprises a valve washer.

36. A multi-function unitary valve system for use in a fluid system containing a fluid and having pressure testing, pressure relief, and drain/test free fluid flow capability, comprising, in combination:
   a) a valve body having an inlet portion, an outlet portion, and a valve seat;
   b) a valve riser affixed to said valve body and having an upper end;
   c) a valve stem concentrically disposed within said valve riser and having an upper portion and a lower portion;
   d) a first sealing means for assisting sealing at said valve seat, affixed to said lower portion of said valve stem and structured and arranged for engagement with said valve seat when said valve stem is lowered;
   e) a blocking means for implementing blocking of movement of said valve stem away from said valve seat;
   f) an urging means for urging said first sealing means towards said valve seat; and
   g) a second sealing means, attached to said lower portion of said valve stem, for preventing said fluid from.

37. A multi-function unitary valve system according to claim 36 wherein said first sealing means is irremovably seated against said valve seat when said valve stem is blocked by said blocking means, whereby pressure testing capability is provided.

38. A multi-function unitary valve system for use with a valve having a valve seat, a valve washer, a valve stem, a valve riser, a rotary handle threadedly held by the valve riser, and a blocking element held by the rotary handle, and providing, for use in a fluid system containing a fluid, a pressure testing, pressure relief, and drain/test free fluid flow function, comprising the pressure testing steps of:
   a) manipulating the rotary handle until the valve washer is seated against the valve seat;
   b) affixing the blocking element in the rotary handle;
   c) manipulating the blocking element until the blocking element contacts the valve stem;
   d) pressurizing the fluid system to a pre-determined testing pressure; and
   e) manipulating the rotary handle, holding the blocking element, until the valve washer is displaced from the valve seat, whereby the pressure is relieved in the fluid system.

39. A multi-function unitary valve system for use in a fluid system containing a fluid and having pressure testing, pressure relief, and drain/test free fluid flow capability, comprising, in combination:
   a) a valve body having an inlet portion, an outlet portion, and a valve seat;
   b) a valve riser affixed to said valve body and having an upper end;
   c) a valve stem concentrically disposed within said valve riser and having an upper portion and a lower portion;
   d) a first sealer, to assist sealing at said valve seat, affixed to said lower portion of said valve stem and structured and arranged for engagement with said valve seat when said valve stem is lowered;
   e) a blocker system structured and arranged to assist implementation of blocking of movement of said valve stem away from said valve seat;
   f) an urger structured and arranged to urge said first sealer towards said valve seat; and
   g) a second sealer, attached to said lower portion of said valve stem, structured and arranged to prevent said fluid from substantial contact with said urger.

40. A multi-function unitary valve system according to claim 39 wherein said blocker system comprises a blocker element removably affixable in said valve system.

41. A multi-function unitary valve system according to claim 40 further comprising:
   a) a controller, adjustably attached to said valve riser, structured and arranged to implement raising and lowering of said valve stem;
   b) wherein said controller is structured and arranged to removably receive said blocker element.

42. A multi-function unitary valve system according to claim 41 wherein said valve riser comprises an integral element of said valve body.

43. A multi-function unitary valve system according to claim 42 wherein said outlet portion of said valve body comprises a downward facing faucet opening.

44. A multi-function unitary valve system according to claim 43 wherein said controller comprises an approximately round cylindrical outer surface having indentations structured and arranged to assist a user to grip controller for turning said controller.

45. A riser for connecting a water supply pipe of a structure to a sprinkler system pipe of the structure comprising, in combination:
   a) a first longitudinal pipe, having a first end and a second end, structured and arranged to connect to the water supply pipe at said first end and to the sprinkler system pipe at said second end; and
   b) extending transversely from said longitudinal pipe and all aligned in parallel relation along a first side of said longitudinal pipe, multiple ports, each said port being structured and arranged to attach to at least one sprinkler system component having at least one capability selected from the group consisting of
      i) safety capabilities
      ii) test capabilities
      iii) monitoring capabilities.

46. A riser according to claim 45, further comprising:
   a) extending transversely from said first longitudinal pipe along a second side of said longitudinal pipe about 180 degrees opposed to said first side, a support, directly attached to said first longitudinal pipe, structured and arranged to assist attachment of said riser to the structure.

47. A riser according to claim 45 wherein each said port is structured and arranged to attach to at least one sprinkler system component having at least one of the following capabilities:
   a) a flow-switch capability for monitoring delivery of the water flow to sprinklers of the sprinkler system;
   b) a test-and-drain-valve capability for testing and draining the sprinkler system;
   c) a pressure-gauge capability for monitoring water pressure in the sprinkler system;
   d) a relief-valve capability for providing over-pressure relief for the sprinkler system.

48. A riser according to claim 47 wherein said port nearest said first end of said longitudinal pipe is structured and arranged to assist attachment to a flow switch.

49. A riser according to claim 48 wherein:
   a) said first longitudinal pipe is no more than about thirteen inches long.

50. A riser according to claim 49 wherein:
   a) said first longitudinal pipe is no more than about eleven inches long.

51. A riser according to claim 48 wherein said port nearest said first end of said first longitudinal pipe comprises a flange connection structured and arranged to assist direct no-pipe-thread attachment of a flow switch.

52. A riser according to claim 51 wherein said flange connection is constructed and arranged for direct no-pipe-thread attachment of a flow switch of the type comprising a housing including a face plate, a sensing switch within the housing, a sensing paddle outside the housing and connected by a connector member through the face plate to the sensing switch, screw attachments for connecting the face plate to a flange member, and a cylindrical seal member, co-axial with the sensing paddle and encircling the connector member, for sealing a face-plate-to-flange-member connection.

53. A riser according to claim 51 wherein said flange connection comprises:
   a) a flange;
   b) a smooth female bore central to said flange of said flange connection;
   c) wherein said flange comprises at least two flange connectors each structured and arranged to assist a connection to the flow meter.

54. A riser according to claim 51 wherein said flange connection comprises:
   a) a flange;
   b) a male hollow round cylinder element extending outwardly and centrally from said flange;
   c) wherein said male hollow round cylinder element comprises at least one external sealer structured and arranged to seal a flow meter of the type comprising a female bore connector; and
   d) wherein said flange comprises at least two flange connectors each structured and arranged to assist a connection to the flow meter.

55. A riser according to claim 51 wherein said flange connection comprises:
   a) a flange;
   b) wherein said flange comprises external threads structured and arranged to match internal threads of a flow meter connection element; and
   c) wherein an outer face of said flange comprises a flat surface structured and arranged for sealing against a face of the flow meter connection element.

56. A riser according to claim 47 wherein said multiple ports comprises three said ports in the following order in a direction from said first end of said first longitudinal pipe to said second end of said first longitudinal pipe:
   a) a first said port structured and arranged to attach to at least one sprinkler system component having at least a flow-switch capability for monitoring delivery of the water flow to sprinklers of the sprinkler system;
   b) a second said port structured and arranged to attach to at least one sprinkler system component having at least a test-and-drain-valve capability for testing and draining the sprinkler system and a relief-valve capability for providing over-pressure relief for the sprinkler system;
   c) a third said port structured and arranged to attach to at least one sprinkler system component having at least a pressure-gauge capability for monitoring water pressure in the sprinkler system.

57. A riser according to claim 47 wherein said multiple ports comprises two said ports in the following order in a direction from said first end of said first longitudinal pipe to said second end of said first longitudinal pipe:
   a) a first said port structured and arranged to attach to at least one sprinkler system component having at least a flow-switch capability for monitoring delivery of the water flow to sprinklers of the sprinkler system;
   b) a second said port structured and arranged to attach to at least two sprinkler system components each having at least one of the following capabilities:
      i) a test-and-drain-valve capability for testing and draining the sprinkler system
      ii) a relief-valve capability for providing over-pressure relief for the sprinkler system
      iii) a pressure-gauge capability for monitoring water pressure in the sprinkler system.

58. A riser according to claim 57 wherein said second port is structured and arranged to attach two sprinkler system components:
   a) a first sprinkler system component having a pressure-gauge capability for monitoring water pressure in the sprinkler system; and
   b) a second sprinkler system component having
      i) a test-and-drain-valve capability for testing and draining the sprinkler system, and
      ii) a relief-valve capability for providing over-pressure relief for the sprinkler system.

59. A riser according to claim 58 wherein said second port comprises a second longitudinal pipe extending from and perpendicular to said first longitudinal pipe and wherein said second longitudinal pipe comprises two component attachment structures:
   a) a first component attachment structure suitable to assist in attaching a pressure gauge for monitoring water pressure in the sprinkler system; and
   b) a second component attachment structure suitable to assist in attaching a valve having at least a test-and-drain-valve capability for testing and draining the sprinkler system.

60. A riser according to claim 45 wherein said riser comprises a molded plastic.

61. A riser according to claim 60 wherein said riser comprises essentially CPVC.

62. A riser according to claim 45 further comprising:
   a) at about 90 degrees from said first side of said longitudinal pipe, first indicia indicating a water flow direction and second indicia indicating port identifications; and
   b) at about 270 degrees from said first side of said longitudinal pipe, third indicia indicating a water flow direction and fourth indicia indicating port identifications;
   c) said indicia comprising legible symbols.

63. A riser according to claim 46 wherein said support comprises pedestal means including mounting flange means comprising a mounting hole for assisting attachment of said unitary means to said structure.

64. A riser according to claim 63 wherein said mounting hole is slanted away at an acute angle from a direction perpendicular to said longitudinal pipe.

65. A sprinkler system riser unit for supplying water from a water supply pipe of a structure to a sprinkler system pipe of said structure comprising, in combination:
   a) a first longitudinal pipe, having a first end and a second end, structured and arranged to connect to the water supply pipe at said first end and to the sprinkler system pipe at said second end; and
   b) extending transversely from said longitudinal pipe and all aligned in parallel relation along a first side of said longitudinal pipe, multiple ports, each said port being structured and arranged to attach to at least one sprinkler system component having at least one capability selected from the group consisting of
      i) safety capabilities
      ii) test capabilities
      iii) monitoring capabilities;
   c) extending transversely from said first longitudinal pipe along a second side of said longitudinal pipe about 180 degrees opposed to said first side, a support, directly attached to said first longitudinal pipe, structured and arranged to assist attachment of said riser to the structure;
   d) wherein each said port is structured and arranged to attach to at least one sprinkler system component having at least one of the following capabilities:
      i) a flow-switch capability for monitoring delivery of the water flow to sprinklers of the sprinkler system;
      ii) a test-and-drain-valve capability for testing and draining the sprinkler system;
      iii) a pressure-gauge capability for monitoring water pressure in the sprinkler system;
      iv) a relief-valve capability for providing over-pressure relief for the sprinkler system;
   e) wherein said port nearest said first end of said longitudinal pipe is structured and arranged to assist attachment to a flow switch; and
   f) attached to said riser, the following said sprinkler system components:
      i) a flow switch to monitor delivery of water flow to sprinklers of the sprinkler system;
      ii) a multipurpose valve comprising a test and drain valve to test and drain the sprinkler system, said test and drain valve including a relief valve to provide over-pressure relief for the sprinkler system;
      iii) a pressure gauge to monitor water pressure in the sprinkler system.

66. A sprinkler system riser unit according to claim 65 wherein said multipurpose valve comprises, in combination:
   a) a valve body having an inlet portion, an outlet portion, and a valve seat;
   b) a valve riser affixed to said valve body and having an upper end;
   c) a valve stem concentrically disposed within said valve riser and having an upper portion and a lower portion;
   d) a first sealer, to assist sealing at said valve seat, affixed to said lower portion of said valve stem and structured and arranged for engagement with said valve seat when said valve stem is lowered;
   e) a blocker system structured and arranged to assist implementation of blocking of movement of said valve stem away from said valve seat; and
   an urger structured and arranged to urge said first sealer towards said valve seat.

67. A sprinkler system riser unit according to claim 66 wherein:
   a) said multipurpose valve further comprises a second sealer, attached to said lower portion of said valve stem, structured and arranged to essentially prevent said fluid from contacting said urger.

68. A sprinkler system riser unit according to claim 66 wherein said sprinkler system riser unit is constructed essentially of a molded plastic.

69. A sprinkler system riser unit according to claim 68 wherein said sprinkler system riser unit is constructed essentially of molded CPVC material.

* * * * *

UNITED STATES PATENT AND TRADEMARK OFFICE
CERTIFICATE OF CORRECTION

PATENT NO. : 6,601,604 B1  Page 1 of 1
DATED : August 5, 2003
INVENTOR(S) : Michael S. Cooper It is certified that error appears in the above-identified patent and that said Letters Patent is hereby corrected as shown below:

Column 34,
Line 20, after "inlet portion" insert -- , --
Line 48, "valve seat blocker." should read -- valve seat. --

Column 37,
Line 42, "test-capability" should read -- test capability --

Column 38,
Line 8, after "fluid from" insert -- substantial contact with said urging means --

Column 39,
Line 7, after "grip" insert -- said --

Signed and Sealed this

Twenty-seventh Day of January, 2004

JON W. DUDAS
*Acting Director of the United States Patent and Trademark Office*